US012688505B2

(12) United States Patent
Skalski et al.

(10) Patent No.: US 12,688,505 B2
(45) Date of Patent: Jul. 21, 2026

(54) MACHINE LEARNING SYSTEM

(71) Applicant: FEATURESPACE LIMITED, Cambridge (GB)

(72) Inventors: Piotr Skalski, Cambridge (GB); Kenny Wong, Cambridge (GB); David Sutton, Cambridge (GB); Jason Wong, Cambridge (GB)

(73) Assignee: Featurespace Limited, Cambridge (GB)

( * ) Notice: Subject to any disclaimer, the term of this patent is extended or adjusted under 35 U.S.C. 154(b) by 0 days.

(21) Appl. No.: 17/996,937

(22) PCT Filed: Apr. 28, 2022

(86) PCT No.: PCT/EP2022/061405
§ 371 (c)(1),
(2) Date: Oct. 24, 2022

(87) PCT Pub. No.: WO2023/208355
PCT Pub. Date: Nov. 2, 2023

(65) Prior Publication Data
US 2024/0232889 A1 Jul. 11, 2024

(51) Int. Cl.
G06Q 40/00 (2023.01)
G06N 3/04 (2023.01)
(Continued)

(52) U.S. Cl.
CPC ........... G06Q 20/4016 (2013.01); G06N 3/04 (2013.01); G06N 3/08 (2013.01)

(58) Field of Classification Search
CPC .......................... G06Q 40/02; G06Q 20/4016
See application file for complete search history.

(56) References Cited

U.S. PATENT DOCUMENTS

| 11,146,576 B1 | 10/2021 | Mushtaq |
| 2006/0059568 A1 | 3/2006 | Smith-Michelson et al. |

(Continued)

FOREIGN PATENT DOCUMENTS

| CN | 107645533 | 8/2016 |
| CN | 110348580 | 5/2022 |

(Continued)

OTHER PUBLICATIONS

Sidelov, Pavlo (Anomaly Detection in Finance, SDK.finance, https://sdk.finance/blog/anomaly-detection-in-finance/ Apr. 21, 2021) (Year: 2021).*

(Continued)

*Primary Examiner* — Mark H Gaw
(74) *Attorney, Agent, or Firm* — King & Spalding LLP

(57) ABSTRACT

A machine learning system for processing data corresponding to an incoming transaction. The machine learning system comprises a categorical history module which includes a memory configured to store state data for a plurality of categories indexed by a respective category identifier, wherein the state data stored in the memory for each category identifier corresponds to a previous transaction associated with the entity and the respective category. A decay logic stage is configured to modify state data stored in the memory based on a time difference between a time of the incoming transaction and a time of a previous transaction. When the memory contains state data for the entity and category identifier pair associated with the incoming transaction, a decaying function dependent on the time difference is applied to the stored state data to generate a decayed version. The state data output from the decay logic stage is updated using an input tensor generated from the data corresponding to the incoming transaction to generate updated state data.

26 Claims, 10 Drawing Sheets

(51) Int. Cl.
    *G06N 3/08*          (2023.01)
    *G06Q 20/40*       (2012.01)

(56)             References Cited

U.S. PATENT DOCUMENTS

| | | | |
|---|---|---|---|
| 2008/0120166 A1 | 5/2008 | Fernandez | |
| 2010/0306179 A1* | 12/2010 | Lim | G06F 11/3006 |
| | | | 707/688 |
| 2014/0180974 A1 | 6/2014 | Kennel et al. | |
| 2020/0242265 A1* | 7/2020 | Quinn | G06F 3/0673 |
| 2021/0248448 A1* | 8/2021 | Branco | G06Q 20/4015 |
| 2022/0012742 A1 | 1/2022 | Kielak et al. | |
| 2022/0351209 A1* | 11/2022 | Kishore | G06Q 20/4014 |
| 2023/0118240 A1 | 4/2023 | Wong et al. | |

FOREIGN PATENT DOCUMENTS

| | | | | |
|---|---|---|---|---|
| GB | 2321362 | 7/1998 | | |
| WO | WO 2018/167404 | 9/2018 | | |
| WO | WO 2020060544 | 9/2018 | | |
| WO | WO 2019/050865 | 3/2019 | | |
| WO | WO 2019050864 | 3/2019 | | |
| WO | WO 2020/088007 | 5/2020 | | |
| WO | WO 2022/008131 | 1/2022 | | |
| WO | WO 2022008130 | 1/2022 | | |
| WO | WO-2022008130 A1 * | 1/2022 | | G06N 3/08 |

OTHER PUBLICATIONS

International Search Report for PCT/EP2021/063766, issued Oct. 6, 2021.
International Search Report for PCT /EP2021/063767, issued Oct. 25, 2021.
Search and Examination Report for UK Patent Application No. 2107388.7, issued Jul. 15, 2021.
Search and Examination Report for UK Patent Application No. 2107389.5, issued Jul. 14, 2021.
Longfei Li et al: "A Time Attention based Fraud Transaction Detection Framework", arxiv.org, Cornell University Library, 201 Olin Library Cornell University Ithaca, NY 14853, Dec. 26, 2019.
Xurui Li et al: "Transaction Fraud Detection Using GRU-centered Sandwich-structured Model", axiv.org, Cornell University Library, 201 Olin Library Cornell University Ithaca, NY 14853, Nov. 4, 2017.
Liu Guannan et al: "Fraud detection via behavioral sequence embedding", Knowledge and Information Systems, Springer Verlag, London, GB, vol. 62, No. 7, Jan. 9, 2020.

Vaswani et al., "Attention Is All You Need", available at: https://arxiv.org/abs/1706.03762v5 [accessed Jul. 13, 2021].
Chou Hsin-Ping et al: "Remix: Rebalanced Mixup" In: "Advances in Intelligent Data Analysis XIX". Jul. 8, 2020.
Connor Shorten et al: "A survey on Image Data Augmentation for Deep Learning", Journal of Big Data, vol. 6, Jul. 6, 2019.
Longfei Li, Ziqi Liu, Chaochao Chen, Jun Zhou, Xiaolong Li, A Time Attention based Fraud Transac-tion Detection Framework, Conference 17, Jul. 2017, Washington DC, USA (Year: 2017).
Refka Abdellaoui et al: "Secure Communication for Internet Pay-ment in Heterogeneous Networks", Ad-vanced Information Net-working and Applications (AINA), 2010 24th IEEE International Conference on, IEEE, Piscataway, NJ, USA, Apr. 20, 2010 (Apr. 20, 2010), pp. 1085-1092.
International Search Report for PCT/EP2022/061405, issued Dec. 20, 2022.
Search and Examination Report for GB Patent Application No. GB2206208.7, issued Oct. 25, 2022.
Li, A Time Attention Based Fraud Transaction Detection Frame-work (Year: 2019).
Steyn, Semi-supervised Machine Learning for Textual Anomaly Detection (Year: 2016).
Prusti, Fraudulent Transaction Detection in Credit Card by Apply-ing Ensemble Machine Learning Tech-niques (Year: 2019).
Office Action as issued for GB Patent Application No. GB2618317A, issued Jan. 9, 2026.
Jin, Woojeong et al., Recurrent Event Network: Autoregressive Structure Inference over Temporal Knowledge Graphs, arXiv:1904. 05530 [online], Oct. 6, 2020.
English Translation of Office Action in Japanese Patent App. No. 2024-563395, dated Apr. 23, 2026, 3 pages.
Office Action received for Israeli Patent App. No. 2925116, dated Apr. 29, 2026, 8 pages.
Zhang Y., Attain: Attention-based time-aware LSTM networks for disease progression modeling. Proceedings of the 28th International Joint Conference on Artificial Intelligence (IJCAI-2019), pp. 4369-4375, Macao, China. Jan. 2019.
Bahdanau D., Cho K, Bengio Y., Neural Machine Translation By Jointly Learning To Align and Translate. arXiv preprint arXiv:1409. 0473, pp. 1-15, May 19, 2016.
Luong MT, Pham H, Manning CD, Effective approaches to attention-based neural machine translation. InProceedings of the 2015 con-ference on empirical methods in natural language processing Sep. 2015 (pp. 1412-1421).
Ma F, Chitta R, Zhou J, You Q, Sun T, Gao J., Dipole: Diagnosis prediction in healthcare via attention-based bidirectional recurrent neural networks, Proceedings of the 23rd Acm Sigkdd international conference on knowledge discovery and data mining, Aug. 1, 20173, pp. 1903-1911.

\* cited by examiner

MACHINE LEARNING SYSTEM

TECHNICAL FIELD

This invention relates to a categorical history module for a machine learning system, particularly for use in a machine learning system for detecting anomalies in patterns of data, e.g. for detecting fraudulent transactions. Certain examples relate to a machine learning system for use in real-time transaction processing.

BACKGROUND ART

Digital payments have exploded over the last twenty years, with more than three-quarters of global payments using some form of payment card or electronic wallet. Point of sale systems are progressively becoming digital rather than cash based. Put simply, global systems of commerce are now heavily reliant on electronic data processing platforms. This presents many engineering challenges that are primarily hidden from a lay user. For example, digital transactions need to be completed in real-time, i.e. with a minimal level of delay experienced by computer devices at the point of purchase. Digital transactions also need to be secure and resistant to attack and exploitation. The processing of digital transactions is also constrained by the historic development of global electronic systems for payments. For example, much infrastructure is still configured around models that were designed for mainframe architectures in use over 50 years ago.

As digital transactions increase, new security risks also become apparent. Digital transactions present new opportunities for fraud and malicious activity. In 2015, it was estimated that 7% of digital transactions were fraudulent, and that figure has only increased with the transition of more economic activity online. Fraud losses are estimated to be four times the population of the world (e.g., in US dollars) and are growing.

Financial Services institutions are becoming subject to more regulatory scrutiny as traditional methods of fraud prevention, such as authentication of identity (e.g. passwords, digital biometrics, national ID, and the like) have proven to be ineffective at preventing fraud vectors such as synthetic identities and scams. These far more complicated threat vectors for fraud require significantly more analytics in a very short (sub 50 ms) time, and are often based on a much smaller data sampling size for the scam or fraud itself. This imposes significant technical challenges.

While risks like fraud are an economic issue for companies involved in commerce, the implementation of technical systems for processing transactions is an engineering challenge. Traditionally, banks, merchants and card issuers developed "paper" rules or procedures that were manually implemented by clerks to flag or block certain transactions. As transactions became digital, one approach to building technical systems for processing transactions has been to supply computer engineers with these sets of developed criteria and to ask the computer engineers to implement them using digital representations of the transactions, i.e. convert the hand-written rules into coded logic statements that may be applied to electronic transaction data. This traditional approach has run into several problems as digital transaction volumes have grown. First, any applied processing needs to take place at "real-time", e.g. with millisecond latencies. Second, many thousands of transactions need to be processed every second (e.g., a common "load" may be 1000-2000 per second), with load varying unexpectedly over time (e.g., a launch of a new product or a set of tickets can easily increase an average load level by several multiples). Third, the digital storage systems of transaction processors and banks are often siloed or partitioned for security reasons, yet digital transactions often involve an interconnected web of merchant systems. Fourthly, large scale analysis of actual reported fraud and predicted fraud is now possible. This shows that traditional approaches to fraud detection are found wanting; accuracy is low and false positives are high. This then has a physical effect on digital transaction processing, more genuine point-of-sale and online purchases are declined and those seeking to exploit the new digital systems often get away with it.

In the last few years, a more machine learning approach has been taken to the processing of transaction data. As machine learning models mature in academia, engineers have begun to attempt to apply them to the processing of transaction data. However, this again runs into problems. Even if engineers are provided with an academic or theoretical machine learning model and asked to implement it, this is not straightforward. For example, the problems of large-scale transaction processing systems come into play. Machine learning models do not have the luxury of unlimited inference time as in the laboratory. This means that it is simply not practical to implement certain models in a real-time setting, or that they need significant adaptation to allow real-time processing in the volume levels experienced by real-world servers. Moreover, engineers need to contend with the problem of implementing machine learning models on data that is siloed or partitioned based on access security, and in situations where the velocity of data updates is extreme. The problems faced by engineers building transaction processing systems may thus be seen as akin to those faced by network or database engineers; machine learning models need to be applied but meeting system throughput and query response time constraints set by the processing infrastructure. There are no easy solutions to these problems. Indeed, the fact that many transaction processing systems are confidential, proprietary, and based on old technologies means that engineers do not have the body of knowledge developed in these neighbouring fields and often face challenges that are unique to the field of transaction processing. Moreover, the field of large-scale practical machine learning is still young, and there are few established design patterns or textbooks that engineers can rely on.

Data scientists building machine learning models typically go through much effort to design models, and extract machine learning features for those models, that produce the best trade-offs between detection rate vs precision.

The present invention seeks to provide improvements to machine learning systems for processing transaction data.

SUMMARY OF THE INVENTION

In accordance with a first aspect, embodiments of the present invention provide a machine learning system for processing data corresponding to an incoming transaction associated with an entity, the machine learning system comprising a categorical history module configured to process at least some of said data, the categorical history module comprising:
  i) a memory configured to store state data for a plurality of categories indexed by a respective category identifier, wherein the state data stored in the memory for each category identifier corresponds to a previous transaction associated with the entity and the respective category;

ii) a decay logic stage configured to modify state data stored in the memory based on a time difference between a time of the incoming transaction and a time of a previous transaction, said decay logic stage being configured to:

a) when the memory contains state data for the entity and category identifier pair associated with the incoming transaction, retrieve said state data and apply a decaying function to the state data to generate a decayed version of the state data, wherein the decaying function is dependent on the time difference, and output the decayed version of the state data; and iii) an update logic stage configured to: update the state data output from the decay logic stage using an input tensor generated from the data corresponding to the incoming transaction to generate updated state data; to store said updated state data in the memory for the entity and category identifier pair associated with the incoming transaction; and to output an output tensor comprising the updated state data;

iv) wherein the machine learning system is configured to map the output tensor from the categorical history module to a scalar value representative of a likelihood that the incoming transaction presents an anomaly within a sequence of actions; and v) wherein the scalar value is used to determine whether to approve or decline the incoming transaction.

The first aspect of the invention also extends to a method of processing data associated with a proposed transaction associated with an entity, the method comprising:

i) storing, in a memory, state data for a plurality of categories indexed by a respective category identifier, wherein the state data stored in the memory for each category identifier corresponds to a previous transaction associated with the entity and the respective category;

ii) modifying state data stored in the memory based on a time difference between a time of the incoming transaction and a time of a previous transaction, wherein the step of modifying the state data comprises:

a) when the memory contains state data for the entity and category identifier pair associated with the incoming transaction, retrieving said state data and applying a decaying function to the state data to generate a decayed version of the state data, wherein the decaying function is dependent on the time difference, and outputting the decayed version of the state data; and iii) updating the state data output using an input tensor generated from the data corresponding to the incoming transaction to generate updated state data; storing said updated state data in the memory for the entity and category identifier pair associated with the incoming transaction; and outputting an output tensor comprising the updated state data;

iv) mapping the output tensor to a scalar value representative of a likelihood that the incoming transaction presents an anomaly within a sequence of actions; and v) using the scalar value to determine whether to approve or decline the incoming transaction.

The first aspect of the invention further extends to a non-transitory computer-readable medium comprising instructions that, when executed by a processor, cause the processor to carry out a method of processing data associated with a proposed transaction associated with an entity, the method comprising:

i) storing, in a memory, state data for a plurality of categories indexed by a respective category identifier, wherein the state data stored in the memory for each category identifier corresponds to a previous transaction associated with the entity and the respective category;

ii) modifying state data stored in the memory based on a time difference between a time of the incoming transaction and a time of a previous transaction, wherein the step of modifying the state data comprises:

a) when the memory contains state data for the entity and category identifier pair associated with the incoming transaction, retrieving said state data and applying a decaying function to the state data to generate a decayed version of the state data, wherein the decaying function is dependent on the time difference, and outputting the decayed version of the state data; and ii) updating the state data output using an input tensor generated from the data corresponding to the incoming transaction to generate updated state data; storing said updated state data in the memory for the entity and category identifier pair associated with the incoming transaction; and outputting an output tensor comprising the updated state data;

iv) mapping the output tensor to a scalar value representative of a likelihood that the incoming transaction presents an anomaly within a sequence of actions; and v) using the scalar value to determine whether to approve or decline the incoming transaction.

The first aspect of the invention further extends to a computer software product comprising instructions that, when executed by a processor, cause the processor to carry out a method of processing data associated with a proposed transaction associated with an entity, the method comprising:

i) storing, in a memory, state data for a plurality of categories indexed by a respective category identifier, wherein the state data stored in the memory for each category identifier corresponds to a previous transaction associated with the entity and the respective category;

ii) modifying state data stored in the memory based on a time difference between a time of the incoming transaction and a time of a previous transaction, wherein the step of modifying the state data comprises:

a) when the memory contains state data for the entity and category identifier pair associated with the incoming transaction, retrieving said state data and applying a decaying function to the state data to generate a decayed version of the state data, wherein the decaying function is dependent on the time difference, and outputting the decayed version of the state data; and iii) updating the state data output using an input tensor generated from the data corresponding to the incoming transaction to generate updated state data; storing said updated state data in the memory for the entity and category identifier pair associated with the incoming transaction; and outputting an output tensor comprising the updated state data;

iv) mapping the output tensor to a scalar value representative of a likelihood that the incoming transaction presents an anomaly within a sequence of actions; and v) using the scalar value to determine whether to approve or decline the incoming transaction.

When viewed from a second aspect, embodiments of the present invention provide a method of processing data associated with a proposed transaction, the method comprising:

receiving an incoming event from a client transaction processing system, the incoming event being associated with a request for an approval decision for the proposed transaction;

parsing the incoming event to extract data for the proposed transaction, including determining a time difference between the proposed transaction and a prior transaction;

applying the machine learning system of embodiments of the first aspect of the invention to output the scalar value representative of a likelihood that the proposed transaction presents an anomaly within a sequence of actions based on the extracted data and the time difference, said applying comprising accessing the memory to retrieve at least the state data for the entity and the category identifier associated with the transaction;

determining a binary output based on the scalar value output by the machine learning system, the binary output representing whether the proposed transaction is approved or declined; and returning the binary output to the client transaction processing system.

The second aspect of the invention extends to a non-transitory computer-readable medium comprising instructions that, when executed by a processor, cause the processor to carry out a method of processing data associated with a proposed transaction, the method comprising:

receiving an incoming event from a client transaction processing system, the incoming event being associated with a request for an approval decision for the proposed transaction;

parsing the incoming event to extract data for the proposed transaction, including determining a time difference between the proposed transaction and a prior transaction;

applying the machine learning system of embodiments of the first aspect of the invention to output the scalar value representative of a likelihood that the proposed transaction presents an anomaly within a sequence of actions based on the extracted data and the time difference, said applying comprising accessing the memory to retrieve at least the state data for the entity and the category identifier associated with the transaction;

determining a binary output based on the scalar value output by the machine learning system, the binary output representing whether the proposed transaction is approved or declined; and returning the binary output to the client transaction processing system.

The second aspect of the invention extends to a computer software product comprising instructions that, when executed by a processor, cause the processor to carry out a method of processing data associated with a proposed transaction, the method comprising:

receiving an incoming event from a client transaction processing system, the incoming event being associated with a request for an approval decision for the proposed transaction;

parsing the incoming event to extract data for the proposed transaction, including determining a time difference between the proposed transaction and a prior transaction;

applying the machine learning system of embodiments of the first aspect of the invention to output the scalar value representative of a likelihood that the proposed transaction presents an anomaly within a sequence of actions based on the extracted data and the time difference, said applying comprising accessing the memory to retrieve at least the state data for the entity and the category identifier associated with the transaction;

determining a binary output based on the scalar value output by the machine learning system, the binary output representing whether the proposed transaction is approved or declined; and returning the binary output to the client transaction processing system.

When viewed from a third aspect, embodiments of the invention provide a categorical history module for use in a machine learning system for processing data corresponding to an incoming transaction associated with an entity, the categorical history module being configured to process at least some of said data, the categorical history module comprising:

i) a memory configured to store state data for a plurality of categories indexed by a respective category identifier, wherein the state data stored in the memory for each category identifier corresponds to a previous transaction associated with the entity and the respective category;

ii) a decay logic stage configured to modify state data stored in the memory based on a time difference between a time of the incoming transaction and a time of a previous transaction, said decay logic stage being configured to:

a) when the memory contains state data for the entity and category identifier pair associated with the incoming transaction, retrieve said state data and apply a decaying function to the state data to generate a decayed version of the state data, wherein the decaying function is dependent on the time difference, and output the decayed version of the state data; and iii) an update logic stage configured to: update the state data output from the decay logic stage using an input tensor generated from the data corresponding to the incoming transaction to generate updated state data; to store said updated state data in the memory for the entity and category identifier pair associated with the incoming transaction; and to output an output tensor comprising the updated state data.

The third aspect of the invention additionally extends to a method of processing data associated with a proposed transaction associated with an entity, the method comprising:

i) storing, in a memory, state data for a plurality of categories indexed by a respective category identifier, wherein the state data stored in the memory for each category identifier corresponds to a previous transaction associated with the entity and the respective category;

ii) modifying state data stored in the memory based on a time difference between a time of the incoming transaction and a time of a previous transaction, wherein the step of modifying the state data comprises:

a) when the memory contains state data for the entity and category identifier pair associated with the incoming transaction, retrieving said state data and applying a decaying function to the state data to generate a decayed version of the state data, wherein the decaying function is dependent on the time difference, and outputting the decayed version of the state data; and iii) updating the state data output using an input tensor generated from the data corresponding to the incoming transaction to generate updated state data; storing said updated state data in the memory for the entity and category identifier pair associated with the incoming transaction; and outputting an output tensor comprising the updated state data.

The third aspect of the invention further extends to a non-transitory computer-readable medium comprising instructions that, when executed by a processor, cause the processor to carry out a method of processing data associated with a proposed transaction associated with an entity, the method comprising:

i) storing, in a memory, state data for a plurality of categories indexed by a respective category identifier, wherein the state data stored in the memory for each category identifier corresponds to a previous transaction associated with the entity and the respective category;

ii) modifying state data stored in the memory based on a time difference between a time of the incoming transaction and a time of a previous transaction, wherein the step of modifying the state data comprises:

a) when the memory contains state data for the entity and category identifier pair associated with the incoming transaction, retrieving said state data and applying a decaying function to the state data to generate a decayed version of the state data, wherein the decaying function is dependent on the time difference, and outputting the decayed version of the state data; and iii) updating the state data output using an input tensor generated from the data corresponding to the incoming transaction to generate updated state data; storing said updated state data in the memory for the entity and category identifier pair associated with the incoming transaction; and outputting an output tensor comprising the updated state data.

The third aspect of the invention further extends to a computer software product comprising instructions that, when executed by a processor, cause the processor to carry out a method of processing data associated with a proposed transaction associated with an entity, the method comprising:

i) storing, in a memory, state data for a plurality of categories indexed by a respective category identifier, wherein the state data stored in the memory for each category identifier corresponds to a previous transaction associated with the entity and the respective category;

ii) modifying state data stored in the memory based on a time difference between a time of the incoming transaction and a time of a previous transaction, wherein the step of modifying the state data comprises:

a) when the memory contains state data for the entity and category identifier pair associated with the incoming transaction, retrieving said state data and applying a decaying function to the state data to generate a decayed version of the state data, wherein the decaying function is dependent on the time difference, and outputting the decayed version of the state data; and iii) updating the state data output using an input tensor generated from the data corresponding to the incoming transaction to generate updated state data; storing said updated state data in the memory for the entity and category identifier pair associated with the incoming transaction; and outputting an output tensor comprising the updated state data.

BRIEF DESCRIPTION OF THE DRAWINGS

Certain embodiments of the present invention will now be described with reference to the accompanying drawings, in which.

DETAILED DESCRIPTION

Figure 1A:
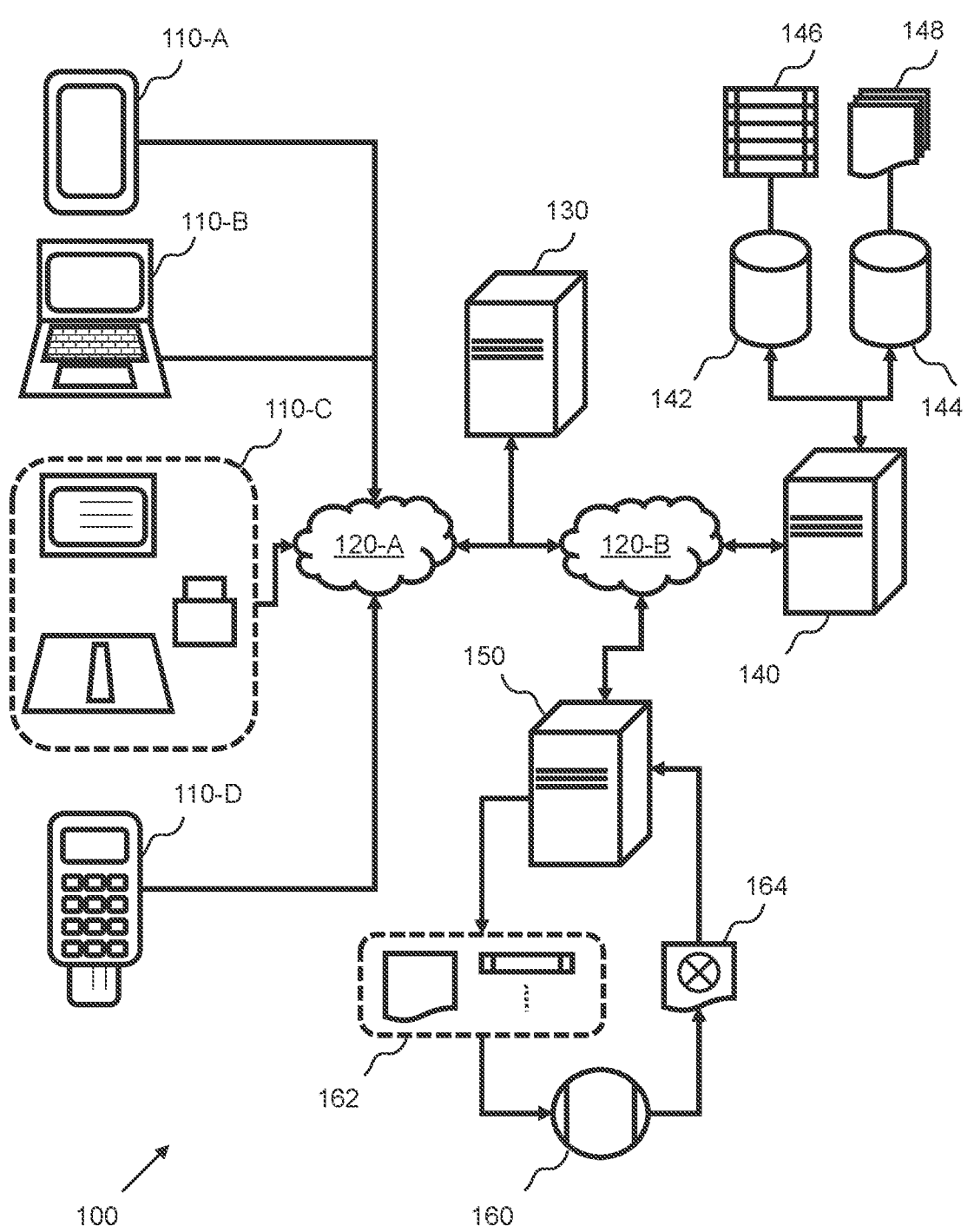
FIGS. 1A to 1C are schematic diagrams showing different example electronic infrastructures for transaction processing.

Certain exemplary embodiments are described herein which relate to a machine learning system for use in transaction processing. In certain embodiments, a machine learning system is applied in real-time, high-volume transaction processing pipelines to provide an indication of whether a transaction or entity matches previously observed and/or predicted patterns of activity or actions, e.g. an indication of whether a transaction or entity is "normal" or "anomalous". The term "behavioural" is used herein to refer to this pattern of activity or actions. The indication may comprise a scalar value normalised within a predefined range (e.g., 0 to 1) that is then useable to prevent fraud and other misuse of payment systems. The machine learning systems may apply machine learning models that are updated as more transaction data is obtained, e.g. that are constantly trained based on new data, so as to reduce false positives and maintain accuracy of the output metric. The present examples may be particularly useful for preventing fraud in cases where the physical presence of a payment card cannot be ascertained (e.g., online transactions referred to as "card-not-present") or for commercial transactions where high-value transactions may be routine and where it may be difficult to classify patterns of behaviour as "unexpected". As such, the present examples facilitate the processing of transactions as these transactions to being primarily "online", i.e. conducted digitally over one or more public communications networks.

Certain embodiments described herein allow machine learning models to be tailored to be specific to patterns of behaviour between certain pairs of entities (such as account holders) and categories (such as merchants, transaction amounts, times of day, and others). For example, the machine learning models may model entity-category-pair specific patterns of behaviour. The machine learning systems described herein are able to provide dynamically updating machine learning models despite large transaction flows and/or despite the need for segregation of different data sources.

Exemplary embodiments may be applied to a wide variety of digital transactions, including, but not limited to, card payments, so-called "wire" transfers, peer-to-peer payments, Bankers' Automated Clearing System (BACS) payments, and Automated Clearing House (ACH) payments. The output of the machine learning system may be used to prevent a wide variety of fraudulent and criminal behaviour such as card fraud, application fraud, payment fraud, merchant fraud, gaming fraud and money laundering.

The present exemplary machine learning systems, e.g. as configured and/or as trained as outlined below, is configured to detect novelty in entity-category interactions.

Terms

In the context of this specification "comprising" is to be interpreted as "including". Aspects of the invention comprising certain elements are also intended to extend to alternative embodiments "consisting" or "consisting essentially" of the relevant elements.

The term "memory" should be understood to mean any means suitable for the storage of data and includes both volatile and non-volatile memory as appropriate for the intended application. Those skilled in the art will appreciate that this includes, but is not limited to, random access memory (RAM), static RAM (SRAM), dynamic RAM (DRAM), magnetic storage, solid-state storage, and flash memory. It will be appreciated that combinations of one or more of these may also be used for the storage of data, as technically appropriate (e.g. using faster access volatile memory for frequently accessed data).

The term "data" is used in different contexts herein to refer to digital information, such as that represented by known bit structures within one or more programming languages. In use, data may refer to digital information that is stored as bit sequences within computer memory. Certain machine learning models may operate on structured arrays of data of a predefined bit format. Those skilled in the art will readily appreciated that these may be referred to as arrays, multidimensional arrays, matrices, vectors, tensors, or other such similar terms. It should be noted that for machine learning methods multidimensional arrays or tensors, e.g. with a defined extent in multiple dimensions, may be "flattened" so as to be represented (e.g., within memory) as a sequence or vector of values stored according to the predefined format (e.g., n-bit integer or floating point number, signed or unsigned). Hence, the term "tensor" as used herein covers multidimensional arrays with one or more dimensions (e.g., vectors, matrixes, volumetric arrays etc).

The principles of the exemplary embodiments apply irrespective of the particular data format chosen. Data may be represented as arrays, vectors, tensors, or any other suitable format. For ease of reference, these terms are used interchangeably herein, and references to a "vector" or "vectors" of values should be understood to extend to any n-dimensional tensor or tensors of values as appropriate. Similarly, references to a "tensor" or "tensors" of values should be understood to extend to vectors, which are understood by those skilled in the art to simply be one-dimensional tensors. The principles of the exemplary embodiments may be applied regardless of the formatting of the data structures used for these arrays of values. For example, state data may be stored in memory as one-dimensional tensors (i.e. vectors) or as a tensor with dimensionality of two or greater (i.e. tensors), and those skilled in the art will readily understand that suitable modifications can be made to the data processing elements to handle the selected data format. The relative positions between various state values, e.g. how they are ordered within a vector or tensor, do not generally matter, and the scope of the present invention is not limited to any particular data format or structure.

The term "structured numeric representation" is used to refer to numeric data in a structured form, such as an array of one or more dimensions that stores numeric values with a common data type, such as integers or float values. A structured numeric representation may comprise a vector or tensor (as used within machine learning terminology). A structured numeric representation is typically stored as a set of indexed and/or consecutive memory locations, e.g. a one-dimensional array of 64-bit floats may be represented in computer memory as a consecutive sequence of 64-bit memory locations in a 64-bit computing system.

The term "transaction data" is used herein to refer to electronic data that is associated with a transaction. A transaction comprises a series of communications between different electronic systems to implement a payment or exchange. In general, transaction data may comprise data indicating events (e.g., actions undertaken in time) that relate to, and may be informative for, transaction processing. Transaction data may comprise structured, unstructured and semi-structured data, or any combination thereof. Transaction data may also include data associated with a transaction, such as data used to process a transaction. In certain cases, transaction data may be used broadly to refer actions taken with respect to one or more electronic devices. Transaction data may take a variety of forms depending on the precise implementation. However, different data types and formats may be converted by pre or post processing as appropriate.

The term "interface" is used herein to refer to any physical and/or logical interface that allows for one or more of data input and data output. An interface may be implemented by a network interface adapted to send and/or receive data, or by retrieving data from one or more memory locations, as implemented by a processor executing a set of instructions. An interface may also comprise physical (network) couplings over which data is received, such as hardware to allow for wired or wireless communications over a particular medium. An interface may comprise an application programming interface and/or a method call or return. For example, in a software implementation, an interface may comprise passing data and/or memory references to a function initiated via a method call, where the function comprises computer program code that is executed by one or more processors; in a hardware implementation, an interface may comprise a wired interconnect between different chips, chipsets or portions of chips. In the drawings, an interface may be indicated by a boundary of a processing block that has an inward and/or outward arrow representing a data transfer.

The terms "component" and "module" are used interchangeably to refer to either a hardware structure that has a specific function (e.g., in the form of mapping input data to output data) or a combination of general hardware and specific software (e.g., specific computer program code that is executed on one or more general purpose processors). A component or module may be implemented as a specific packaged chipset, for example, an Application Specific Integrated Circuit (ASIC) or a programmed Field Programmable Gate Array (FPGA), and/or as a software object, class, class instance, script, code portion or the like, as executed in use by a processor.

The term "machine learning model" is used herein to refer to at least a hardware-executed implementation of a machine learning model or function. Known models within the field of machine learning include logistic regression models, Naïve Bayes models, Random Forests, Support Vector Machines and artificial neural networks. Implementations of classifiers may be provided within one or more machine learning programming libraries including, but not limited to, scikit-learn, TensorFlow, and PyTorch.

The term "map" is used herein to refer to the transformation or conversion of a first set of data values to a second set of data values. The two sets of data values may be arrays of different sizes, with an output array being of lower dimensionality than an input array. The input and output arrays may have common or different data types. In certain examples, the mapping is a one-way mapping to a scalar value.

The term "neural network architecture" refers to a set of one or more artificial neural networks that are configured to perform a particular data processing task. For example, a "neural network architecture" may comprise a particular arrangement of one or more neural network layers of one or more neural network types. Neural network types include convolutional neural networks, recurrent neural networks, and feedforward neural networks. Convolutional neural networks involve the application of one or more convolution operations. Recurrent neural networks involve an internal state that is updated during a sequence of inputs. Recurrent neural networks are thus seen as including a form of recurrent or feedback connection whereby a state of the recurrent neural network at a given time or iteration (e.g., t) is updated using a state of the recurrent neural network at a previous time or iteration (e.g., t-1). Feedforward neural networks involve transformation operations with no feedback, e.g. operations are applied in a one-way sequence from input to output. Feedforward neural networks include plain "neural networks" and "fully-connected" neural networks". Those skilled in the art will appreciate that a "multilayer perceptron" is a term used to describe a fully-connected layer, and is a special case of a feedforward neural network.

The term "deep" neural network are used to indicates that the neural network comprises multiple neural network layers in series (it should be noted this "deep" terminology is used with both feedforward neural networks and recurrent neural networks). Certain examples described herein make use of recurrent and fully-connected neural networks.

A "neural network layer", as typically defined within machine learning programming tools and libraries, may be considered an operation that maps input data to output data. A "neural network layer" may apply one or more parameters such as weights to map input data to output data. One or more bias terms may also be applied. The weights and biases of a neural network layer may be applied using one or more multidimensional arrays or matrices. In general, a neural network layer has a plurality of parameters whose value influence how input data is mapped to output data by the layer. These parameters may be trained in a supervised manner by optimizing an objective function. This typically involves minimizing a loss function. Certain parameters may also be pre-trained or fixed in another manner. Fixed parameters may be considered as configuration data that controls the operation of the neural network layer. A neural network layer or architecture may comprise a mixture of fixed and learnable parameters. A recurrent neural network layer may apply a series of operations to update a recurrent state and transform input data. The update of the recurrent state and the transformation of the input data may involve transformations of one or more of a previous recurrent state and the input data. A recurrent neural network layer may be trained by unrolling a modelled recurrent unit, as may be applied within machine learning programming tools and libraries. Although a recurrent neural network may be seen to comprise several (sub) layers to apply different gating operations, most machine learning programming tools and libraries refer to the application of the recurrent neural network as a whole as a "neural network layer" and this convention will be followed here. Lastly, a feedforward neural network layer may apply one or more of a set of weights and biases to input data to generate output data. This operation may be represented as a matrix operation (e.g., where a bias term may be included by appending a value of 1 onto input data). Alternatively, a bias may be applied through a separate addition operation. As discussed above, the term "tensor" is used, as per machine learning libraries, to refer to an array that may have multiple dimensions, e.g. a tensor may comprise a vector, a matrix or a higher dimensionality data structure. In preferred example, described tensors may comprise vectors with a predefined number of elements.

To model complex non-linear functions, a neural network layer as described above may be followed by a non-linear activation function. Common activation functions include the sigmoid function, the tanh function, and Rectified Linear Units (RELUs). Many other activation functions exist and may be applied. An activation function may be selected based on testing and preference. Activation functions may be omitted in certain circumstances, and/or form part of the internal structure of a neural network layer. The example neural network architectures described herein may be configured via training. In certain cases, "learnable" or "trainable" parameters may be trained using an approach called backpropagation. During backpropagation, the neural network layers that make up each neural network architecture are initialized (e.g., with randomized weights) and then used to make a prediction using a set of input data from a training set (e.g., a so-called "forward" pass). The prediction is used to evaluate a loss function. For example, a "ground-truth" output may be compared with a predicted output, and the difference may form part of the loss function. In certain examples, a loss function may be based on an absolute difference between a predicted scalar value and a binary ground truth label. The training set may comprise a set of transactions. If gradient descent methods are used, the loss function is used to determine a gradient of the loss function with respect to the parameters of the neural network architecture, where the gradient is then used to back propagate an update to the parameter values of the neural network architecture. Typically, the update is propagated according to the derivative of the weights of the neural network layers. For example, a gradient of the loss function with respect to the weights of the neural network layers may be determined and used to determine an update to the weights that minimizes the loss function. In this case, optimization techniques such as gradient descent, stochastic gradient descent, Adam etc. may be used to adjust the weights. The chain rule and auto-differentiation functions may be applied to efficiently compute the gradient of the loss function, working back through the neural network layers in turn.

Overview

Thus it will be appreciated that exemplary embodiments provide an improved arrangement in which state data relating to previous transactions of a matching category is stored in memory, and the stored state data for a given category is retrieved the next time there is a transaction matching that category for that same entity, i.e. for the pair of entity and category identifier associated with the new incoming transaction. The categories that may be used are explained in further detail below, however in general the categories may include e.g. the merchant, the type of merchant, a transaction amount, a time of day, or some combination of these.

An exemplary machine learning system for processing data corresponding to an incoming transaction associated with an entity includes a categorical history module that is configured to process at least some of said data, the categorical history module comprising:

i) a memory configured to store state data for a plurality of categories indexed by a respective category identifier, wherein the state data stored in the memory for each category identifier corresponds to a previous transaction associated with the entity and the respective category;

ii) a decay logic stage configured to modify state data stored in the memory based on a time difference between a time of the incoming transaction and a time of a previous transaction, said decay logic stage being configured to:

a) when the memory contains state data for the entity and category identifier pair associated with the incoming transaction, retrieve said state data and apply a decaying function to the state data to generate a decayed version of the state data, wherein the decaying function is dependent on the time difference, and output the decayed version of the state data; and iii) an update logic stage configured to: update the state data output from the decay logic stage using an input tensor generated from the data corresponding to the incoming transaction to generate updated state data; to store said updated state data in the memory for the entity and category identifier pair associated with the incoming transaction; and to output an output tensor comprising the updated state data;

iv) wherein the machine learning system is configured to map the output tensor from the categorical history module to a scalar value representative of a likelihood that the incoming transaction presents an anomaly within a sequence of actions; and v) wherein the scalar value is used to determine whether to approve or decline the incoming transaction.

An exemplary categorical history module provides a mechanism for tracking patterns across transactions of a particular category. Unlike conventional mechanisms such as a time-decay cell which generally retrieves the state from the last transaction (i.e. the immediately preceding transaction for that entity), the categorical history module selectively retrieves state data corresponding to the same category as the present transaction, which may not be the most recent transaction, and a significant period of time may have elapsed since the last transaction of that category was processed, with any number of intervening transactions having occurred in the meantime corresponding to other categories. This allows for signals to be extracted that provide information regarding the novelty of interactions between an entity and a particular category, where such novelty—or behavioural patterns relating to that novelty—may be indicative of anomalous behaviour (e.g. fraud).

Advantageously, exemplary embodiments may provide for significant improvements in the speed and/or confidentiality of implementation. Specifically, data scientists no longer need to manually engineer features of this type, which means they do not need to be disclosed for model governance as inputs to the classifier, and implementation time for the models may be reduced.

Exemplary embodiments may also advantageously provide improvements in detection performance. The categorical history module can learn more subtle interaction logic than human beings are able to engineer by hand in finite time. Specifically, the categorical history module can learn that only activity of a particular type should qualify as trust-building for scoring activity of the current type. The Applicant has found that usage of exemplary embodiments typically translates into significant detection boosts relative to approaches that may be known in the art per se.

Exemplary embodiments may be applied to a wide variety of digital transactions, including, but not limited to, card payments, so-called "wire" transfers, peer-to-peer payments, Bankers' Automated Clearing System (BACS) payments, and Automated Clearing House (ACH) payments. The output of the machine learning system may be used to prevent a wide variety of fraudulent and criminal behaviour such as card fraud, application fraud, payment fraud, merchant fraud, gaming fraud and money laundering.

As outlined above, the categorical history module retrieves state data corresponding to the same category as the incoming transaction. In general, the memory may store state data for every possible category (e.g. for each merchant or each merchant type), however in practice this may not be the case. There may, for example, be limitations imposed on the number of categories for which state data can be stored in memory. This may be due to a hardware or software limitation for a given implementation, or may be a design decision to limit the amount of retained state data to some particular quantity. It is therefore possible that an incoming transaction may correspond to a category for which there is no existing state data for the corresponding category identifier stored in the memory at that time. In some embodiments, the decay logic stage is further configured to generate new state data and output said new state data if the memory does not contain state data for the entity and category identifier pair associated with the incoming transaction. The new state data may, for example, typically comprise a zero tensor—however, it will be appreciated that some other default tensor could be used for the new state data if appropriate.

In general, data from the incoming transaction may be converted into an input tensor suitable for input to the rest of the machine learning system. Those skilled in the art will appreciate that the input tensor may be seen as a feature tensor or vector, i.e. a tensor of values each of which corresponds to the degree to which the incoming transaction has certain features. In some embodiments, the machine learning system further comprises a first neural network stage configured to apply a neural network layer having a respective plurality of learned weights to the data corresponding to the incoming transaction to generate the input tensor, and to provide said input tensor to the update logic stage of the categorical history module. In other words, the first neural network may be described as an embedding layer. This first neural network may, in some embodiments, comprise a first multilayer perceptron (MLP).

Similarly, the output tensor produced by the update logic stage is mapped to the scalar value, as outlined above. In some embodiments, the machine learning system further comprises a second neural network stage configured to apply a second neural network layer having a respective plurality of learned weights to the output tensor generated by the update logic stage of the categorical history module to generate the scalar value representative of the likelihood that the incoming transaction presents an anomaly within a sequence of actions. This second neural network may, in some embodiments, comprise a second multilayer perceptron (MLP).

Those skilled in the art will appreciate that an MLP is a type of feedforward neural network that is generally constructed from at least an input layer, a hidden layer, and an output layer, wherein each layer comprises a number of nodes. The hidden and output layer nodes have an activation function (e.g. a nonlinear activation function). The nodes from each layer are connected to the nodes in the subsequent layer (generally each node in one layer connects to every node in the next layer) with a certain weight. These weights may be learned during a training phase, e.g. during supervised learning, such as via backpropagation.

In some embodiments, the update logic stage comprises: a third neural network stage configured to generate the updated state data using the decayed state data and the input tensor derived from the incoming transaction. In other words, the updated state data may also be generated by a neural network layer. This neural network layer may also use weights that are trained. The third neural network stage may, in some embodiments, comprise a recurrent neural network.

The amount of time that elapses between consecutive transactions for a given entity (e.g. card holder) that belong to a particular category may vary significantly. For example, if the categories include a merchant identity and state data is stored for each merchant (i.e. the state data from the previous buyer-seller interaction involving that card holder and merchant), it may be that the card might be used one merchant several times a week, while that same card may go weeks or months between transactions for another merchant. Similarly, different entities may have transactions at quite different rates, and the patterns of behaviour for any given entity may vary over time. Previous patent applications by the Applicant, published as Patent Cooperation Treaty Application Nos. WO/2022/008130 and WO/2022/008131—each of which is incorporated herein by reference—describe an arrangement in which the state data for a given entity is decayed based on the time period that has elapsed since that state data was stored (i.e. since the last transaction for that entity).

It has been appreciated that the amount of time that has elapsed since the relevant state data retrieved from memory for the particular entity and category combination of an incoming transaction was stored can have a significant impact on its relevance when making a determination as to the legitimacy of the new incoming transaction. The decay logic stage modifies the state data to reduce its influence.

The decaying function is used to lessen the impact of previous state data, depending on how old it is. In a set of embodiments, the decay logic stage is configured to modify the state data stored in the memory for the entity associated with the incoming transaction based on a time difference between the time of the incoming transaction and a time of a most recent transaction for that entity. In other words, in such embodiments the entire state data table for an entity is decayed each time there is a transaction for that entity. Advantageously, this approach does not require any record keeping of when each category was last seen for that entity, but rather a single timestamp is used for each entity, where that timestamp corresponds to the last transaction for that entity (regardless of which category that transaction related to). In some such embodiments, the memory is configured to store a timestamp for the state data stored in said memory for each entity. Decaying the state table for the specific entity may advantageously reduce latency (compared to decaying the table for all entities) while removing the need to store timestamps for each entity-category pair (as in the case where only state data for the specific entity-category pair is decayed, as outlined in respect of an alternative set of embodiments below).

In an alternative set of embodiments, the decay logic stage is configured to modify all state data stored in the memory for each entity based on a time difference between the time of the incoming transaction and a time of an immediately preceding transaction. In other words, in such embodiments the entire state data table for all entities is decayed each time there is a transaction, regardless of which entity that transaction was for, using a timestamp associated with the last transaction (irrespective of who that transaction involved). It will be appreciated, however, that this may impose significant computing requirements to mitigate against unwanted increases to latency.

In a further alternative set of embodiments, the decay logic stage is configured to modify only the state data stored in the memory for the entity and category identifier pair associated with the incoming transaction, wherein the decay logic stage modifies said state data based on a time difference between the time of the incoming transaction and a time of the previous transaction for the entity and category identifier pair associated with the incoming transaction. Under this arrangement, only the state data for the particular entity and category combination is decayed each time there is a transaction for that same combination. In some such embodiments, the memory is configured to store a timestamp for each state data stored in said memory. The timestamp(s) may form part of the state data or may be store separately. Advantageously, this approach does not require decaying the entire table each transaction, which may allow for faster processing at a trade-off of increased memory use to store the timestamps.

There are a number of options for implementing the storage of the state data in the memory. However, in some embodiments, the memory is configured as a stack, such that retrieved state data is removed from the stack, and such that updated state data is stored at the top of the stack. In accordance with such embodiments, the most recent entity-category interactions can be found at the top of the stack, with the least recent interactions at the bottom of the stack.

In some embodiments, the categorical history module is configured such that, when the memory is full, state data stored against at least one category identifier is erased. In some such embodiments, the categorical history module is configured such that when the memory is full, state data stored against a least recently seen category identifier is erased. Under such arrangements, the oldest data is 'dropped' from the memory to make space for new data. In effect, this provides an additional 'forgetting' function in which, assuming an appropriate selection of memory size, data that is too old is removed. In general, the size of the memory may be selected to ensure that data that it would be desirable to retain is not routinely erased from the memory.

In some embodiments, the state data stored for each entity and category identifier pair comprises a tensor of values. Each value in the tensor may correspond to some feature or combination of features that transactions may have, with the magnitude of the value providing a measure of how strongly the transaction (or pattern of previous transactions) exhibits those features.

In some such embodiments, the decaying function applies a respective decay multiplier (e.g. an exponential decay) to each of the values. It will be appreciated that different multipliers (e.g. different exponential decays) may be applied to each value. The use of different decay multipliers for different values allows for the strength of memory to be set differently for different features. It may be desirable for the history of certain features to be retained for longer periods of time than others. For example, state data may relate to (i.e. be dependent on) an average transaction amount for transactions of the entity and category identifier pair, and it may be useful to retain the influence of this average for months at a time (e.g. 6 or 12 months). Meanwhile, state data dependent on transaction velocity (i.e. the rate of transactions per unit time) may be of interest over a shorter time period (e.g. over the course of 1 or 2 hours), and so it may be preferred to limit its influence beyond such a period. It will be appreciated that, in practice, the values stored in the state data may not have a direct (i.e. one-to-one) correspondence to any specific feature or features, but rather are each a function of one or more features. In other words, the numeric values produced (e.g. via a neural network layer) are stored as the state data, and each numeric value may have a complex dependence on multiple features. The relationship between those feature(s) and the corresponding state data value (i.e. numeric value) attributed may be learned during training. It should be understood, therefore, that there is not necessarily any user-specified decay of state data relating to any specific feature(s), but rather that the machine learning system may learn that historic state data derived from certain features (such as the examples described earlier)—or combinations of such feature(s)—should be retained longer than others.

The decay multipliers can be selected as appropriate to tailor the degree of memory retention for each feature, as appropriate. These decay multipliers may, at least in some embodiments, be predetermined, i.e. they may be set in advance. In accordance with some such embodiments, the machine learning system may learn that values derived from certain features or combinations of features should be subject to one of more of these decay factors to different degrees, i.e. the decay factors influence an end-to-end training process.

In some embodiments, however, at least some (and potentially all) of the decay multipliers may be learned. Rather than providing a selection of decay factors in advance, the machine learning system may learn for itself the best decay factors to use and what state data those learned decay factors should be used for.

Generally, the decay multipliers may be arranged in a tensor (or vector, etc.) such that the time decays can be multiplied element-wise with the state data to be decayed. Where the categorical state data is stored in a table with each column may be indexed by the category identifier, the tensor (or vector, etc.) of time decays may be multiplied element-wise with each column of the table. It will of course be appreciated that the table could, equivalently, be configured such that the state data is stored in rows indexed by the category identifier instead.

As outlined above, the categorical history module provides for patterns across transactions for specific entity and category pairs to be retained. In some embodiments, the machine learning system further comprises a time-decay cell module configured to process at least some of the data corresponding to the incoming transaction, the time-decay cell module comprising a second memory configured to store second state data corresponding to an immediately preceding transaction; and a second decay logic stage configured to modify the second state data stored in the second memory based on a time difference between a time of the incoming transaction and a time of the immediately preceding transaction. Those skilled in the art will appreciated that, unlike the categorical history module, the time-decay cell module acts on a transaction-by-transaction basis for a particular entity, irrespective of the category those transactions relate to.

In accordance with such embodiments, the categorical history module and time-decay cell module may be arranged in parallel with one another, and provide complementary analysis of the incoming transaction. The categorical history module helps to detect anomalies (e.g. fraud) based on the novelty of interactions between the entity (e.g. card holder) and the category (e.g. merchant, merchant type time of day, transaction amount, etc.), while the time-decay cell module helps to detect anomalies based on recent transaction behaviour for that entity across all categories.

In some such embodiments, wherein the time-decay cell module further comprises a fourth neural network stage configured to determine next state data using previous state data modified by the second decay logic stage and a second input tensor derived from the incoming transaction, said fourth neural network stage being configured to store the next state data in the second memory. The fourth neural network stage may, in some embodiments, comprise a recurrent neural network.

Data corresponding to the incoming transaction is supplied to each of the categorical history module and time-decay cell, in embodiments where both are provided. Each of these modules may receive different data, or there may be some (or potentially full) overlap in the data each module receives. In general, it is expected that the two modules will act on different features, and so the data provided to each module may be specific to the respective modules.

Where a neural network layer (e.g. an MLP) with learned weights is used to generate the input tensor from the incoming transaction, the same neural network layer may generate the input tensor such that a first portion of the input tensor is supplied to the categorical history module and a second portion of the input tensor is supplied to the time-decay cell module.

In some embodiments in which a time-decay cell module is used, the machine learning system is configured to map output data from both the time-decay cell module and the categorical history module to the scalar value representative of the likelihood that the incoming transaction presents an anomaly within a sequence of actions.

In some embodiments, the memory is configured to store state data for a plurality of entities, wherein for each entity there is stored a plurality of categories indexed by a respective category identifier, wherein the state data stored in the memory for each category identifier corresponds to a previous transaction associated with the respective entity and the respective category.

It will be appreciated that the 'categories' referred to herein relate to some aspect of the transaction, that is to say the categories may be seen as groups or labels that can be applied to transactions meeting some criteria. For example, the categories may represent different secondary entities (e.g. merchants) with which the entity (or 'primary' entity, which may be e.g. a cardholder) engages in transactions. There are a number of different categories that could be used. In some embodiments, each of the plurality of categories comprises one or more of: a secondary entity; a secondary entity type; a transaction value; a transaction value band; a day of the week; a time of the day; an hour of the day; and a time window. In a particular set of embodiments, the plurality of categories may comprise a composite of one or more of these categories.

Example Transaction Processing System

Figure 6:
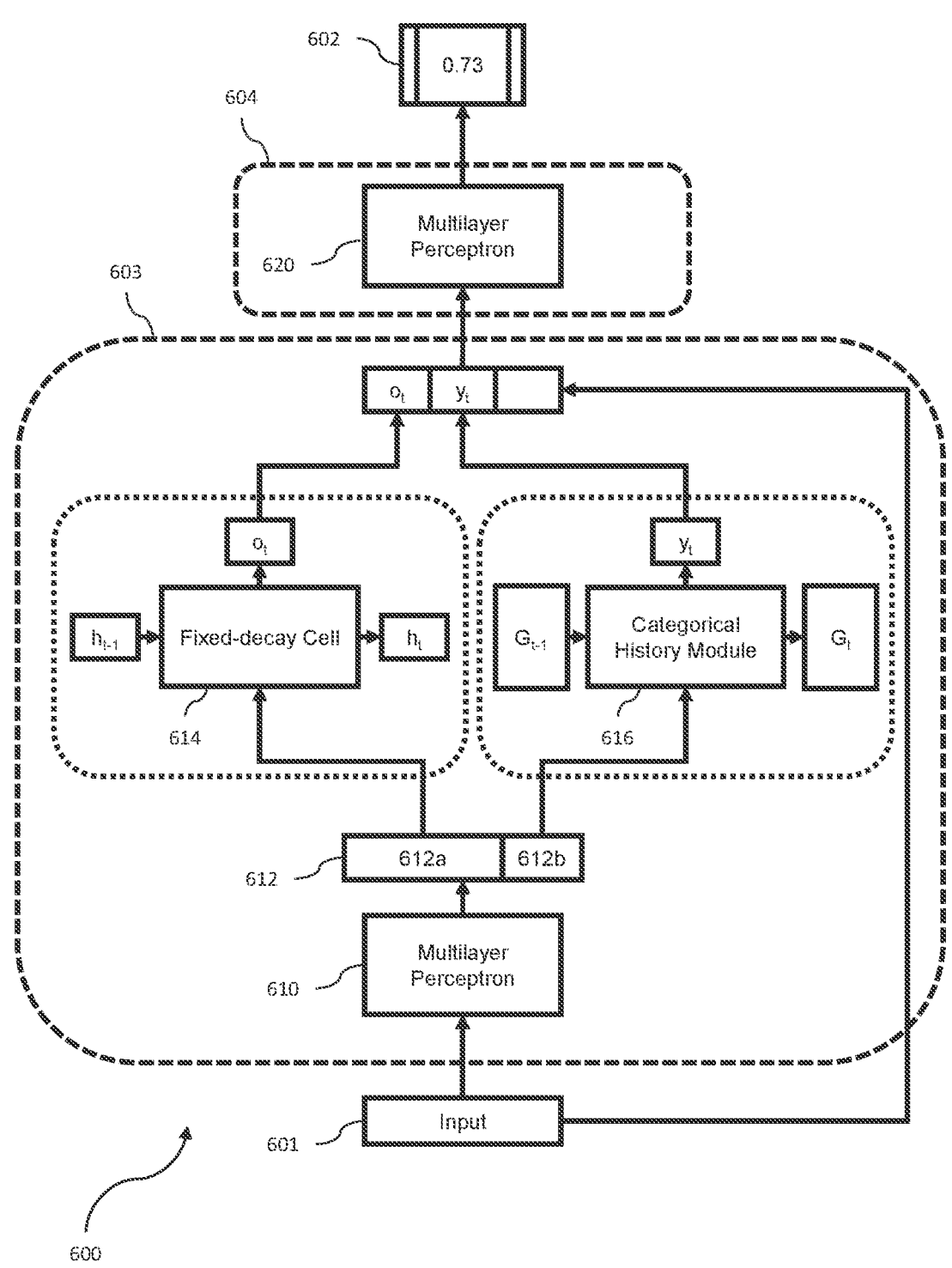
FIG. 6 is a schematic diagram showing a machine learning system in accordance with an exemplary embodiment.
Figure 7:
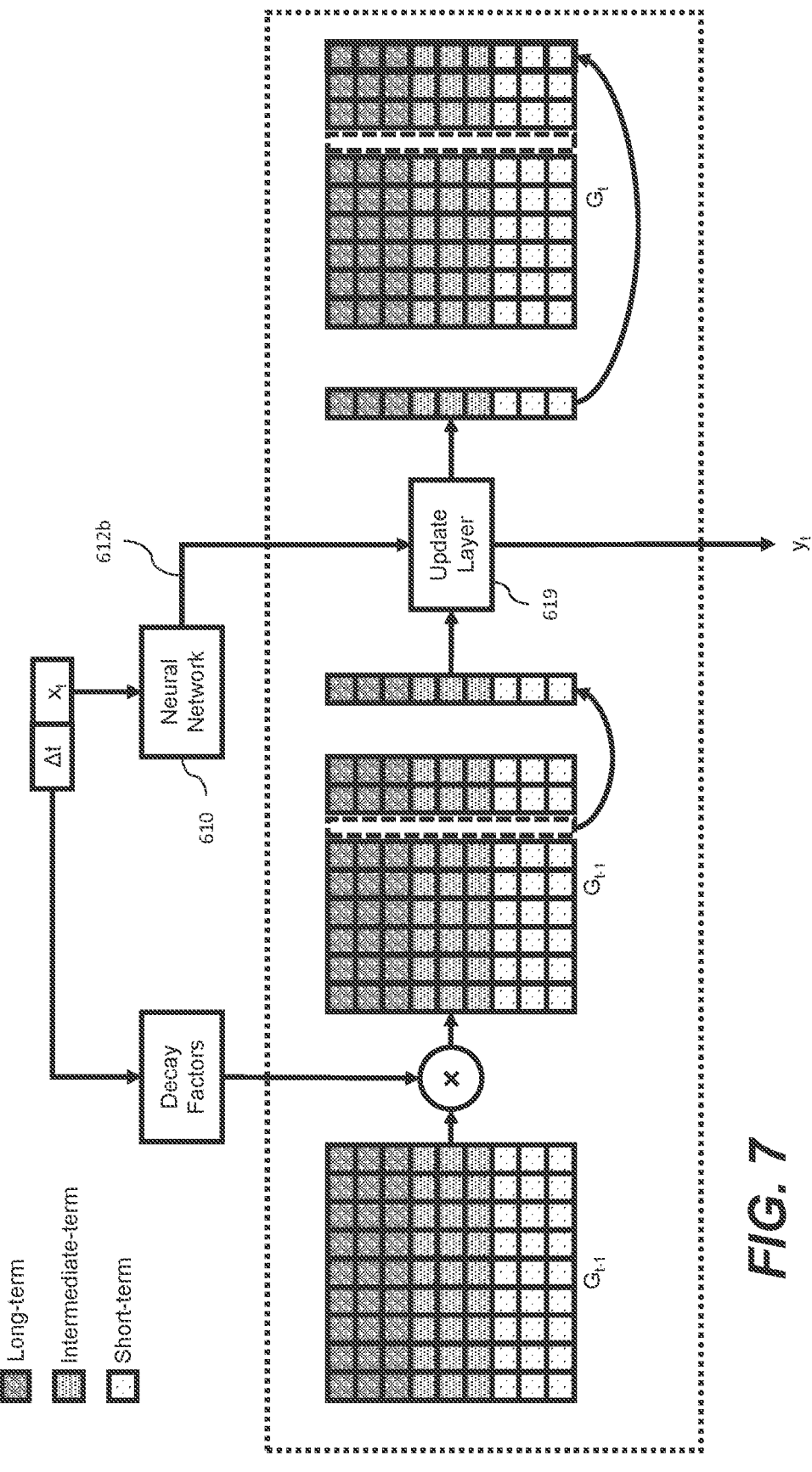
FIG. 7 is a schematic diagram showing operation of the categorical history module used in the machine learning system of FIG. 6.

A non-limiting exemplary embodiment of a machine learning system in accordance with an embodiment of the invention is described below. FIGS. 1A to 5B provide context for the machine learning system. A machine learning system in the form of a specific neural network architecture as is shown in FIGS. 6 and 7.

Figure 1B:
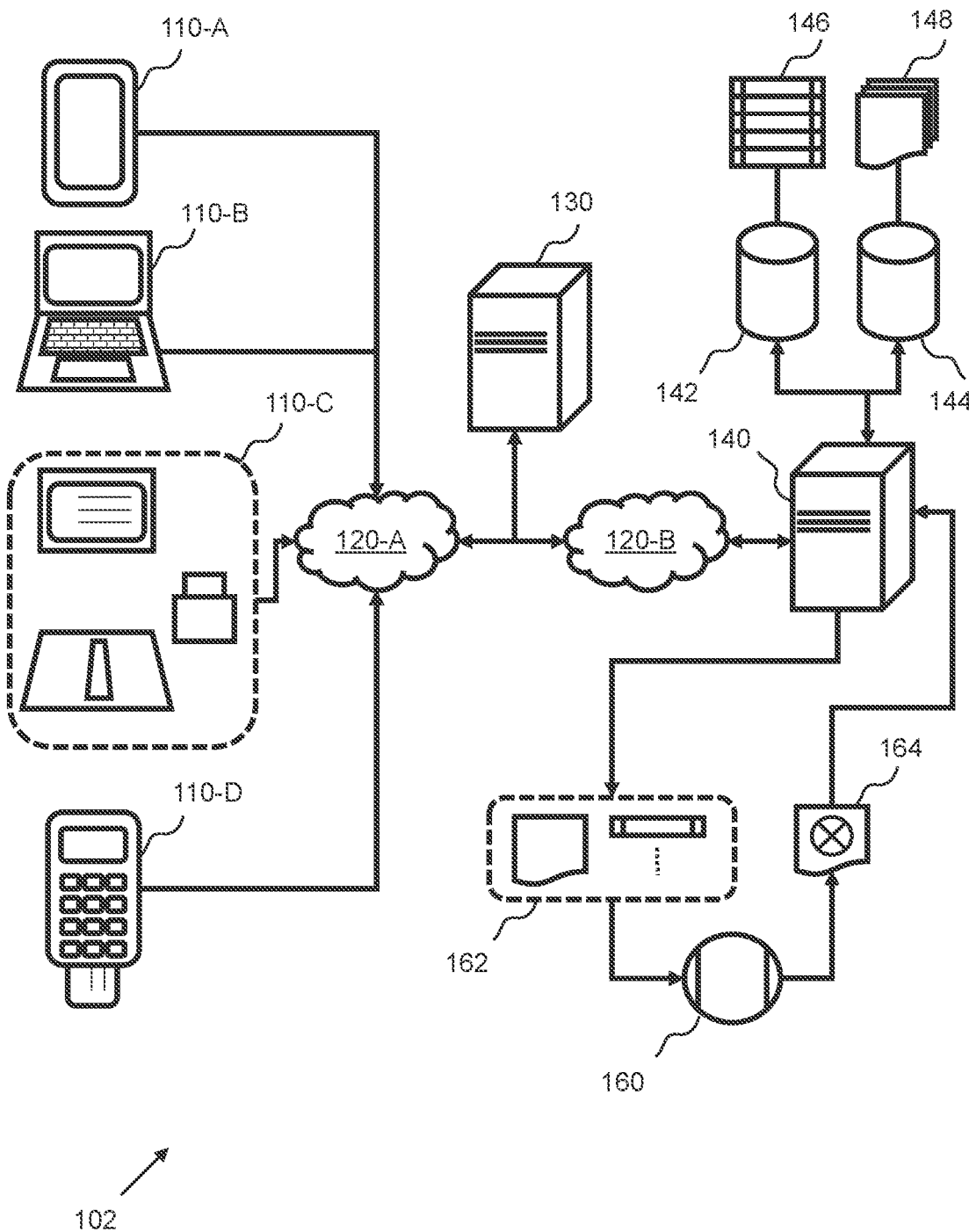
Figure 1C:
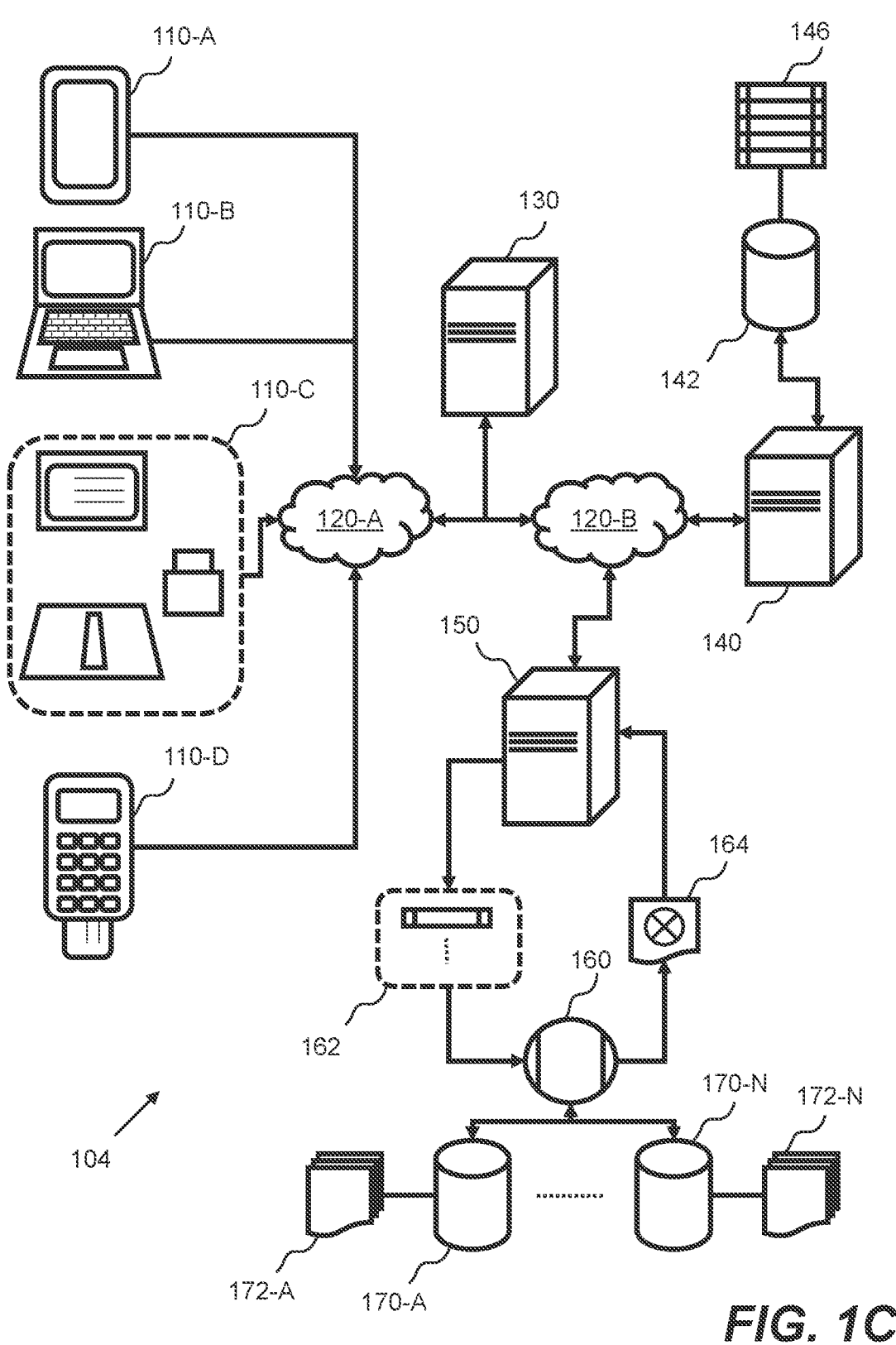

FIGS. 1A to 1C show a set of example transaction processing systems 100, 102, 104. These example transaction processing systems are described to provide context for the inventions discussed herein but should not be seen as limiting; the configuration of any one implementation may differ based on the specific requirements of that implementation. However, the described example transaction processing systems allow those skilled in the art to identify certain high-level technical features that are relevant for the description below. The three example transaction processing systems 100, 102, 104 show different areas where variation may occur.

FIGS. 1A to 1C show a set of client devices 110 that are configured to initiate a transaction. In this example, the set of client devices 110 comprise a smartphone 110-A, a computer 110-B, a point-of-sale (POS) system 110-C and a portable merchant device 110-D. These client devices 110 provide a set of non-exhaustive examples. Generally, any electronic device or set of devices may be used to undertake a transaction. In one case, the transaction comprises a purchase or payment. For example, the purchase or payment may be an online or mobile purchase or payment made by way of the smartphone 110-A or the computer 110-B, or may be a purchase or payment made at a merchant premises, such as via the POS system 110-C or the portable merchant device 110-D. The purchase or payment may be for goods and/or services.

In FIGS. 1A to 1C, the client devices 110 are communicatively coupled to one or more computer networks 120. The client devices 110 may be communicatively coupled in a variety of ways, including by one or more wired and/or wireless networks including telecommunications networks. In preferred examples, all communications across the one or more computer networks are secured, e.g. using Transport Layer Security (TLS) protocols. In FIG. 1A, two computer networks are shown 120-A and 120-B. These may be separate networks or different portions of a common network. The first computer network 120-A communicatively couples the client devices 110 to a merchant server 130. The merchant server 130 may execute a computer process that implements a process flow for the transaction. For example, the merchant server 130 may be a back-end server that handles transaction requests received from the POS system 110-C or the portable merchant device 110-D or may be used by an online merchant to implement a website where purchases may be made. It will be appreciated that the examples of FIGS. 1A to 1C are necessary simplifications of actual architectures; for example, there may be several interacting server devices that implement an online merchant, including separate server devices for providing HyperText Markup Language (HTML) pages detailing a product and/or service and for handling a payment process.

In FIG. 1A, the merchant server 130 is communicatively coupled to a further set of back-end server devices to process the transaction. In FIG. 1A, the merchant server 130 is communicatively coupled to a payment processor server 140 via a second network 120-B. The payment processor server 140 is communicatively coupled to a first data storage device 142 storing transaction data 146 and a second data storage device 144 storing ancillary data 148. The transaction data 146 may comprise batches of transaction data relating to different transactions that are undertaken over a period of time. The ancillary data 148 may comprise data associated with the transactions, such as records storing merchant and/or end user data. In FIG. 1A, the payment processor server 140 is communicatively coupled to a machine learning server 150 via the second network 120-B. The machine learning server 150 implements a machine learning system 160 for the processing of transaction data. The machine learning system 160 is arranged to receive input data 162 and to map this to output data 164 that is used by the payment processor server 140 to process a particular transaction, such as one arising from the client devices 110. In one case, the machine learning system 160 receives at least transaction data associated with the particular transaction and provides an alert or numeric output that is used by the payment processor server 140 to determine whether the transaction is to be authorised (i.e., approved) or declined. As such, the output of the machine learning system 160 may comprise a label, alert or other indication of fraud, or general malicious or anomalous activity. The output may comprise a probabilistic indication, such as a score or probability. In one case, the output data 164 may comprise a scalar numeric value. The input data 162 may further comprise data derived from one or more of the transaction data 146 and the ancillary data 148. In one case, the output data 164 indicates a level of deviation from a specific expected pattern of behaviour based on past observations or measurements. For example, this may indicate fraud or criminal behaviour as this often differs significantly from observed patterns of behaviour, especially on a large scale. The output data 164 may form a behavioural measure. The expected pattern of behaviour may be defined, either explicitly or implicitly, based on observed interactions between different entities within the transaction process flow, such as end users or customers, merchants (including point-of-sale and back-end locations or entities where these may differ), and banks.

The machine learning system 160 may be implemented as part of a transaction processing pipeline. An example transaction processing pipeline is described later with respect to FIGS. 5A and 5B. A transaction processing pipeline may comprise electronic communications between the client devices 110, merchant server 130, payment processor server 140 and machine learning server 150. Other server devices may also be involved, such as banking servers that provide authorisation from an issuing bank. In certain cases, client devices 110 may directly communicate with the payment processor server 140. In use, a transaction processing pipeline typically needs to be completed within one or two hundred milliseconds. In general, sub-second processing times may be deemed real-time (e.g., human beings typically perceive events on a timespan of 400 ms). Furthermore, 100-200 ms may be the desired maximum latency of the full round-trip-time for transaction processing; within this timespan, the time allotted for the machine learning system 160 may be a small fraction of this full amount, such as 10 ms (i.e., less that 5-10% of the target processing time), as most of the time may be reserved for other operations in the transaction processing flow. This presents a technical constraint for the implementation of the machine learning system 160. Furthermore, in real-world implementations, average processing volumes may be on the order of 1000-2000 a second. This means that most "off-the-shelf"

machine learning systems are not suitable to implement machine learning system 160. It further means that most machine learning approaches described in academic papers cannot be implemented within the aforementioned transaction processing pipeline without non-obvious adaptations.

Moreover, existing machine learning systems do not extract entity-category interaction novelty. As will be explained later with reference to FIGS. 6 and 7, a machine learning system in accordance with an exemplary embodiment may be used to provide a number of technical benefits.

FIG. 1B shows a variation 102 of the example transaction processing system 100 of FIG. 1A. In this variation 102, the machine learning system 160 is implemented within the payment processor computer infrastructure, e.g. executed by the payment processor server 140 and/or executed on a locally coupled server within the same local network as the payment processor server 140. The variation 102 of FIG. 1B may be preferred for larger payment processors as it allows faster response times, greater control, and improved security. However, functionally, the transaction processing pipeline may be similar to that of FIG. 1A. For example, in the example of FIG. 1A, the machine learning system 160 may be initiated by a secure external application programming interface (API) call, such as a Representation State Transfer (REST) API call using Hypertext Transfer Protocol Secure (HTTPS), while in FIG. 1B, the machine learning system 160 may be initiated by an internal API call, but where a common end API may handle both requests (e.g., the REST HTTPS API may provide an external wrapper for the internal API).

FIG. 1C shows another variation 104 of the example transaction processing system 100 of FIG. 1A. In this variation 104, the machine learning system 160 is communicatively coupled to local data storage devices 170. For example, data storage devices 170 may be on the same local network as machine learning server 150 or may comprise a local storage network accessible to the machine learning server 150. In this case, there are a plurality of local data storage devices 170-A to 170-N, where each data storage device stores partitioned ancillary data 172. The partitioned ancillary data 172 may comprise parameters for one or more machine learning models. In one case, the ancillary data 172 may comprise a state for machine learning models, where the state may relate to a specific entity such as a user or merchant. The partitioning of the ancillary data 172 may need to be applied to meet security requirements set by a third party, such as the payment processor, one or more banks and/or one or more merchants. In use, the machine learning system 160 accesses the ancillary data 172-A to 172-N via the plurality of local data storage devices 170-A to 170-N based on the input data 162. For example, the input data 162 may be received by way of an API request from a particular source and/or may comprise data that identifies that a particular partition is to be used to handle the API request. More details of different storage systems that may be applied to meet security requirements are set out in FIGS. 2A and 2B.

Example Data Storage Configurations

Figures 2A, 2B:
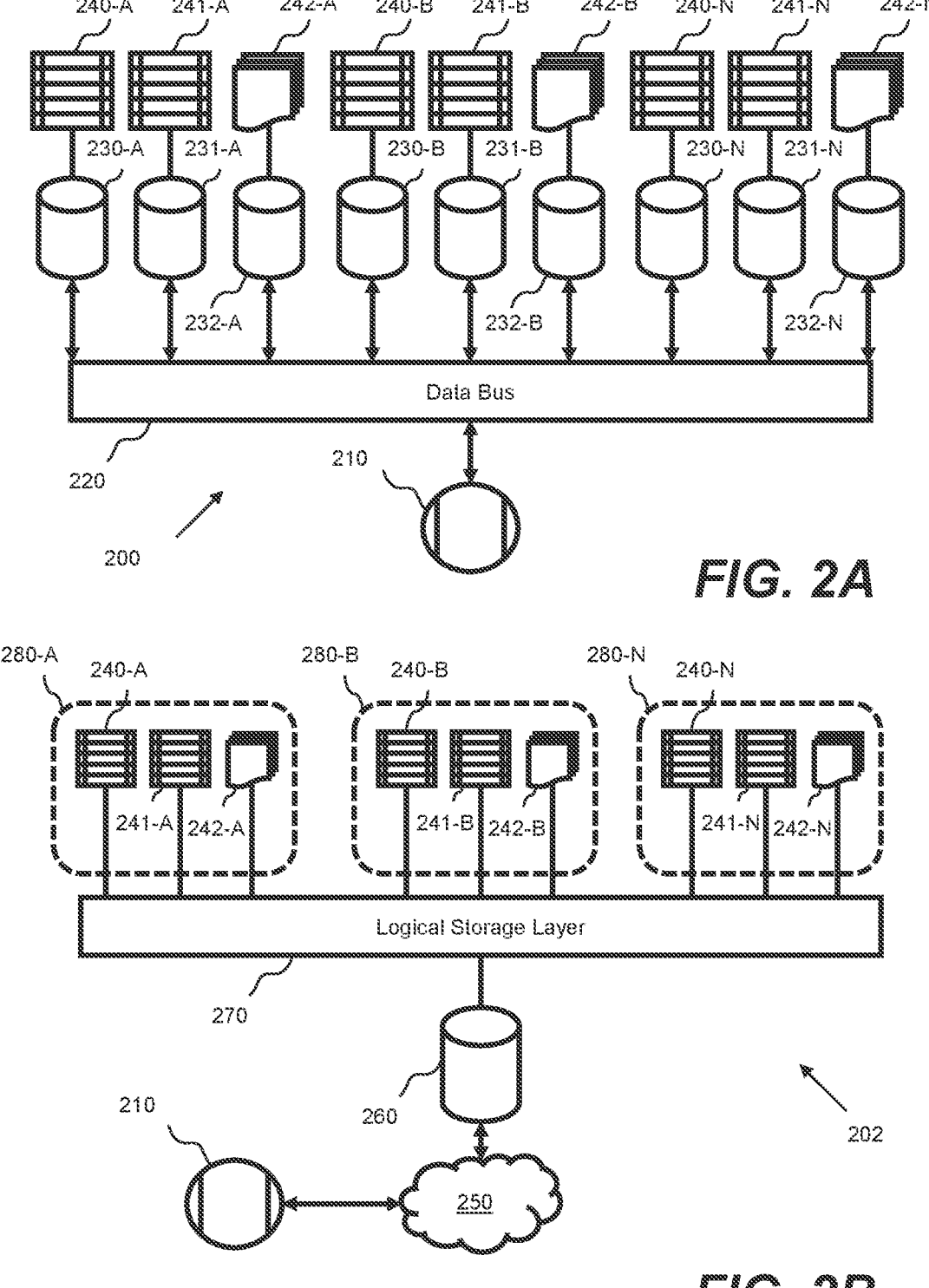
FIGS. 2A and 2B are schematic diagrams showing different examples of data storage systems for use by a machine learning transaction processing system.

FIGS. 2A and 2B show two example data storage configurations 200 and 202 that may be used by an example machine learning system 210 for the processing of transaction data. The examples of FIGS. 2A and 2B are two non-limiting examples that show different options available for implementations, and particular configurations may be selected according to individual circumstances. The machine learning system 210 may comprise an implementation of the machine learning system 160 described in the previous examples of FIGS. 1A to 1C. The examples of FIGS. 2A and 2B allow for the processing of transaction data that is secured using heterogeneous cryptographic parameters, e.g. for the machine learning system 210 to securely process transaction data for heterogeneous entities. It will be appreciated that the configurations of FIGS. 2A and 2B may not be used if the machine learning system 160 is implemented for a single set of secure transaction and ancillary data, e.g. within an internal transaction processing system or as a hosted system for use by a single payment processor.

FIG. 2A shows a machine learning system 210 communicatively coupled to a data bus 220. The data bus 220 may comprise an internal data bus of the machine learning server 150 or may form part of storage area network. The data bus 220 communicatively couples the machine learning system 210 to a plurality of data storage devices 230, 231, 232. The data storage devices 230, 231, 232 may comprise any known data storage device such as magnetic hard disks and solid-state devices. Although data storage devices 230, 231, 232 are shown as different devices in FIG. 2A they may alternatively form different physical areas or portions of storage within a common data storage device. In FIG. 2A, the plurality of data storage devices 230, 231, 232 store entity transaction data 240, categorical history transaction data 241 (e.g. a table of stored state data for entity-category pairs, as outlined in more detail later), and ancillary data 242.

In FIG. 2A, a first set of data storage devices 230 store entity transaction data 240; a second set of data storage devices 231 store categorical history transaction data 241; and a third set of data storage devices 232 store ancillary data 242.

Ancillary data 242 may comprise one or more of model parameters for a set of machine learning models (such as trained parameters for a neural network architecture and/or configuration parameters for a random forest model) and state data for those models. In one case, the different sets of entity transaction data 240-A to N, categorical history transaction data 241-A to N, and ancillary data 242-A to N are associated with different entities that are securely and collectively use services provided by the machine learning system 210, e.g. these may represent data for different banks that need to be kept separate as part of the conditions of providing machine learning services to those entities.

FIG. 2B shows another way different sets of entity transaction data 240-A to N, categorical history transaction data 241-A to N, and ancillary data 242-A to N may be stored. In FIG. 2B the machine learning system 210 is communicatively coupled, via data transfer channel 250, to at least one data storage device 260. The data transfer channel 250 may comprise a local storage bus, local storage area network, and/or remote secure storage coupling (e.g., as overlaid over insecure networks such as the Internet). In FIG. 2B, a secure logical storage layer 270 is provided using the physical data storage device 260. The secure logical storage layer 270 may be a virtualized system that appears as separate physical storage devices to the machine learning system 210 while actually being implemented independently upon the at least one data storage device 260. The logical storage layer 270 may provide separate encrypted partitions 280 for data relating to groups of entities (e.g., relating to different issuing banks etc.) and the different entity transaction data 240-A to N, categorical history transaction data 241-A to N, and ancillary data 242-A to N may be stored in the corresponding partitions 280-A to N. In certain cases, entities may be dynamically created as transactions are received for processing based on data stored by one or more of the server systems shown in FIGS. 1A to 1C.

Example Transaction Data

Figure 3A:
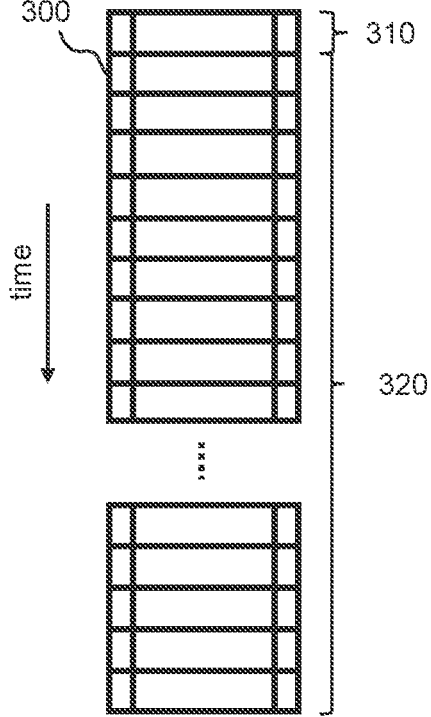
FIGS. 3A and 3B are schematic diagrams showing different examples of transaction data.
Figure 3B:
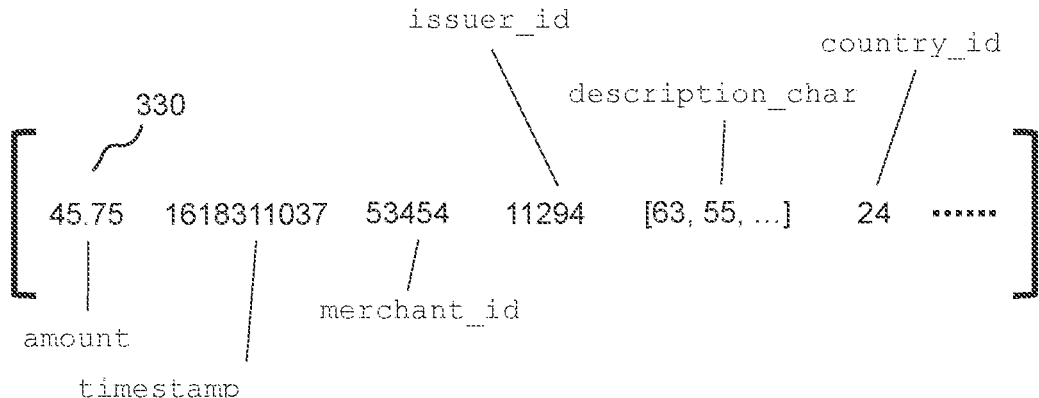

FIGS. 3A and 3B show examples of transaction data that may be processed by a machine learning system such as 160 or 210. FIG. 3A shows how transaction data may comprise a set of time-ordered records 300, where each record has a timestamp and comprises a plurality of transaction fields. In certain cases, transaction data may be grouped and/or filtered based on the timestamp. For example, FIG. 3A shows a partition of transaction data into current transaction data 310 that is associated with a current transaction and "older" or historical transaction data 320 that is within a predefined time range of the current transaction. The time range may be set as a hyperparameter of any machine learning system. Alternatively, the "older" or historical transaction data 320 may be set as a certain number of transactions. Mixtures of the two approaches are also possible.

FIG. 3B shows how transaction data 330 for a particular transaction may be stored in numeric form for processing by one or more machine learning models. For example, in FIG. 3B, transaction data has at least fields: transaction amount, timestamp (e.g., as a Unix epoch), transaction type (e.g., card payment or direct debit), product description or identifier (i.e., relating to items being purchased), merchant identifier, issuing bank identifier, a set of characters (e.g., Unicode characters within a field of predefined character length), country identifier etc. It should be noted that a wide variety of data types and formats may be received and pre-processed into appropriate numerical representations. In certain cases, originating transaction data, such as that generated by a client device and sent to merchant server 130 is pre-processed to convert alphanumeric data types to numeric data types for the application of the one or more machine learning models. Other fields present in the transaction data can include, but are not limited to, an account number (e.g., a credit card number), a location of where the transaction is occurring, and a manner (e.g., in person, over the phone, on a website) in which the transaction is executed.

As outlined in further detail below, the machine learning system 600 of FIGS. 6 and 7 seeks to identify novelty in interactions between an entity (e.g. cardholder) and one or more categories (e.g. merchant, merchant type, transaction amount, time of day, day of the week, etc.). The fields in the transaction data may be used directly to identify the relevant category or categories. Additionally or alternatively, the category or categories associated with the transaction may be inferred or derived from the transaction data. It will be appreciated that such derived categories may be obtained in a multitude of ways. By way of non-limiting example, this may include: simple pre-processing like binning of a numerical feature; pre-processing that combines multiple categories; or a machine learning model that learns to compose useful categories and is trained together with the main machine learning system 600.

Example Machine Learning System

Figure 4:
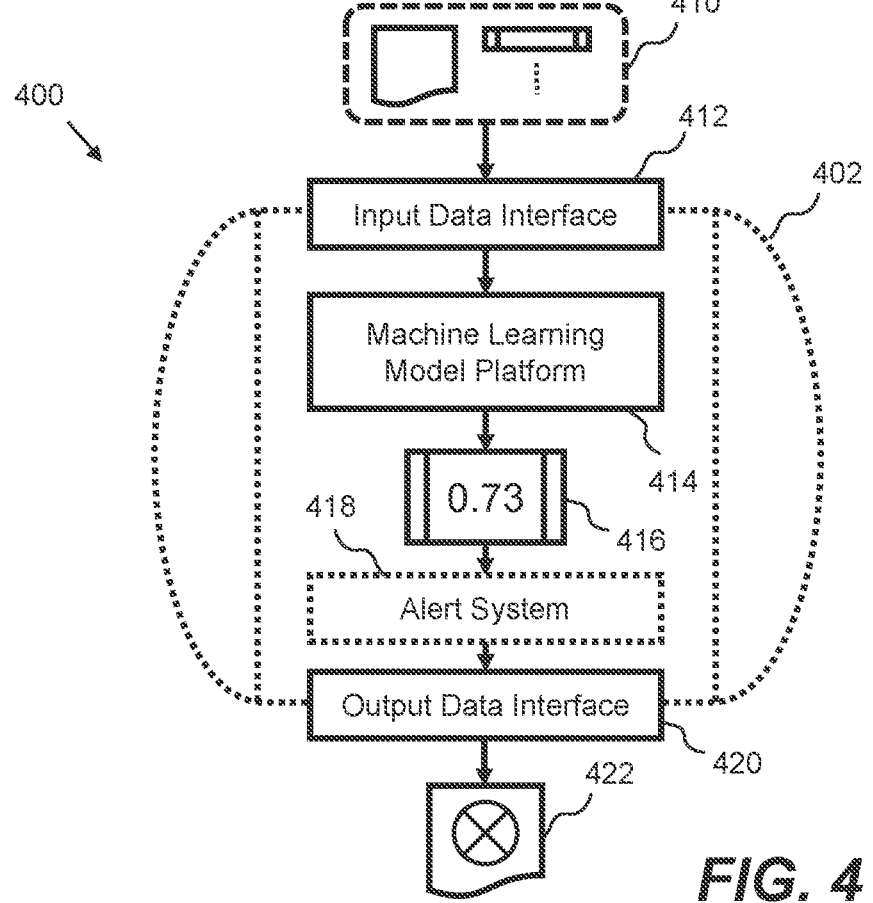
FIG. 4 is a schematic diagram showing example components of a machine learning transaction processing system.

FIG. 4 shows one example 400 of a machine learning system 402 that may be used to process transaction data. Machine learning system 402 may implement one or more of machine learning systems 160 and 210. The machine learning system 402 receives input data 410. The form of the input data 410 may depend on which machine learning model is being applied by the machine learning system 402. In a case where the machine learning system 402 is configured to perform fraud or anomaly detection in relation to a transaction, e.g. a transaction in progress as described above, the input data 410 may comprise transaction data such as 330 (i.e., data forming part of a data package for the transaction) as well as data derived from entity transaction data (such as 300 in FIG. 3A) and/or data derived from categorical history data (as outlined in further detail below) and/or data derived from ancillary data (such as 148 in FIGS. 1A to 1C or 242 in FIGS. 2A and 2B). The ancillary data may comprise secondary data linked to one or more entities identified in the primary data associated with the transaction. For example, if transaction data for a transaction in progress identifies a user, merchant and one or more banks associated with the transaction (such as an issuing bank for the user and a merchant bank), such as via unique identifiers present in the transaction data, then the ancillary data may comprise data relating to these transaction entities. The ancillary data may be used to enrich the information available to the neural network layers. The ancillary data may also comprise data derived from records of activity, such as interaction logs and/or authentication records. In one case, the ancillary data is stored in one or more static data records and is retrieved from these records based on the received transaction data. Additionally, or alternatively, the ancillary data may comprise machine learning model parameters that are retrieved based on the contents of the transaction data. For example, machine learning models may have parameters that are specific to one or more of the user, merchant and issuing bank, and these parameters may be retrieved based on which of these is identified in the transaction data. For example, one or more of users, merchants, and issuing banks may have corresponding embeddings, which may comprise retrievable or mappable tensor representations for said entities. For example, each user or merchant may have a tensor representation (e.g., a floating-point vector of size 128-1024) that may either be retrieved from a database or other data storage or may be generated by an embedding layer, e.g. based on a user or merchant index.

The input data 410 is received at an input data interface 412. The input data interface 412 may comprise an API interface, such as an internal or external API interface as described above. In one case, the payment processor server 140 as shown in FIGS. 1A to 1C makes a request to this interface, where the request payload contains the transaction data. The API interface may be defined to be agnostic as to the form of the transaction data or its source. The input data interface 412 is communicatively coupled to a machine learning model platform 414. In one case, a request made to the input data interface 412 triggers the execution of the machine learning model platform 414 using the transaction data supplied to the interface. The machine learning model platform 414 is configured as an execution environment for the application of one or more machine learning models to the input data 410. In one case, the machine learning model platform 414 is arranged as an execution wrapper for a plurality of different selectable machine learning models. For example, a machine learning model may be defined using a model definition language (e.g., similar to, or using, markup languages such as extended Markup Language—XML). Model definition languages may include (amongst others, independently or in combination), SQL, TensorFlow, Caffe, Thinc and PyTorch. In one case, the model definition language comprises computer program code that is executable to implement one or more of training and inference of a defined machine learning model. The machine learning models may, for example, comprise, amongst others, artificial neural network architectures, ensemble models, regression models, decision trees such as random forests, graph models, and Bayesian networks. One example machine learning model based on an artificial neural network is described later with reference to FIG. 6. The machine learning model platform 414 may define common (i.e., shared) input and output definitions such that different machine learning models are applied in a common (i.e., shared) manner.

In the present example, the machine learning model platform 414 is configured to provide at least a single scalar output 416. This may be normalised within a predefined range, such as 0 to 1. When normalised, the scalar output 416 may be seen as a probability that a transaction associated with the input data 410 is fraudulent or anomalous. In this case, a value of "0" may represent a transaction that matches normal patterns of activity for one or more of a user, merchant and issuing bank, whereas a value of "1" may indicate that the transaction is fraudulent or anomalous, i.e. does not match expected patterns of activity (although those skilled in the art will be aware that the normalised range may differ, such as be inverted or within different bounds, and have the same functional effect). It should be noted that although a range of values may be defined as 0 to 1, output values may not be uniformly distributed within this range, for example, a value of "0.2" may be a common output for a "normal" event and a value of "0.8" may be seen as being over a threshold for a typical "anomalous" or fraudulent event. The machine learning model implemented by the machine learning platform 414 may thus implement a form of mapping between high-dimensionality input data (e.g., the transaction data and any retrieve ancillary data) and a single value output. In one case, for example, the machine learning platform 414 may be configured to receive input data for the machine learning model in a numeric format, wherein each defined machine learning model is configured to map input data defined in the same manner. The exact machine learning model that is applied by the machine learning model platform 414, and the parameters for that model, may be determined based on configuration data. The configuration data may be contained within, and/or identified using, the input data 410 and/or may be set based on one or more configuration files that are parsed by the machine learning platform 414.

In certain cases, the machine learning model platform 414 may provide additional outputs depending on the context. In certain implementations, the machine learning model platform 414 may be configured to return a "reason code" capturing a human-friendly explanation of a machine learning model's output in terms of suspicious input attributes. For example, the machine learning model platform 414 may indicate which of one or more input elements or units within an input representation influenced the model output, e.g. a combination of an "amount" channel being above a learnt threshold and a set of "merchant" elements or units (such as an embedding or index) being outside a given cluster. In cases, where the machine learning model platform 414 implements a decision tree, these additional outputs may comprise a route through the decision tree or an aggregate feature importance based on an ensemble of trees. For neural network architectures, this may comprise layer output activations and/or layer filters with positive activations.

In FIG. 4, certain implementations may comprise an optional alert system 418 that receives the scalar output 416. In other implementations, the scalar output 416 may be passed directly to an output data interface 420 without post processing. In this latter case, the scalar output 416 may be packaged into a response to an original request to the input data interface 412. In both cases, output data 422 derived from the scalar output 416 is provided as an output of the machine learning system 402. The output data 422 is returned to allow final processing of the transaction data. For example, the output data 422 may be returned to the payment processor server 140 and used as the basis of a decision to approve or decline the transaction. Depending on implementation requirements, in one case, the alert system 418 may process the scalar output 416 to return a binary value indicating whether the transaction should be approved or declined (e.g., "1" equals decline). In certain cases, a decision may be made by applying a threshold to the scalar output 416. This threshold may be context dependent. In certain cases, the alert system 418 and/or the output data interface 420 may also receive additional inputs, such as explanation data (e.g., the "reason code" discussed above) and/or the original input data. The output data interface 420 may generate an output data package for output data 422 that combines these inputs with the scalar output 416 (e.g., at least for logging and/or later review). Similar, an alert generated by the alert system 418 may include and/or be additionally based on the aforementioned additional inputs, e.g. in addition to the scalar output 416.

The machine learning system 402 may be used in an "online" mode to process a high volume of transactions within a narrowly defined time range. For example, in normal processing conditions the machine learning system 402 may process requests within 7-12 ms and be able to manage 1000-2000 requests a second (these being median constraints from real-world operating conditions). However, the machine learning system 402 may also be used in an "offline" mode, e.g. by providing a selected historical transaction to the input data interface 412. In an offline mode, input data may be passed to the input data interfaces in batches (i.e., groups). The machine learning system 402 may also be able to implement machine learning models that provide a scalar output for an entity as well as, or instead of, a transaction. For example, the machine learning system 402 may receive a request associated with an identified user (e.g., a card or payment account holder) or an identified merchant and be arranged to provide a scalar output 416 indicating a likelihood that the user or merchant is fraudulent, malicious, or anomalous (i.e., a general threat or risk). For example, this may form part of a continuous or periodic monitoring process, or a one-off request (e.g., as part of an application for a service). The provision of a scalar output for a particular entity may be based on a set of transaction data up to and including a last approved transaction within a sequence of transaction data (e.g., transaction data for an entity similar to that shown in FIG. 3A).

Example Transaction Process Flow

Figure 5A:
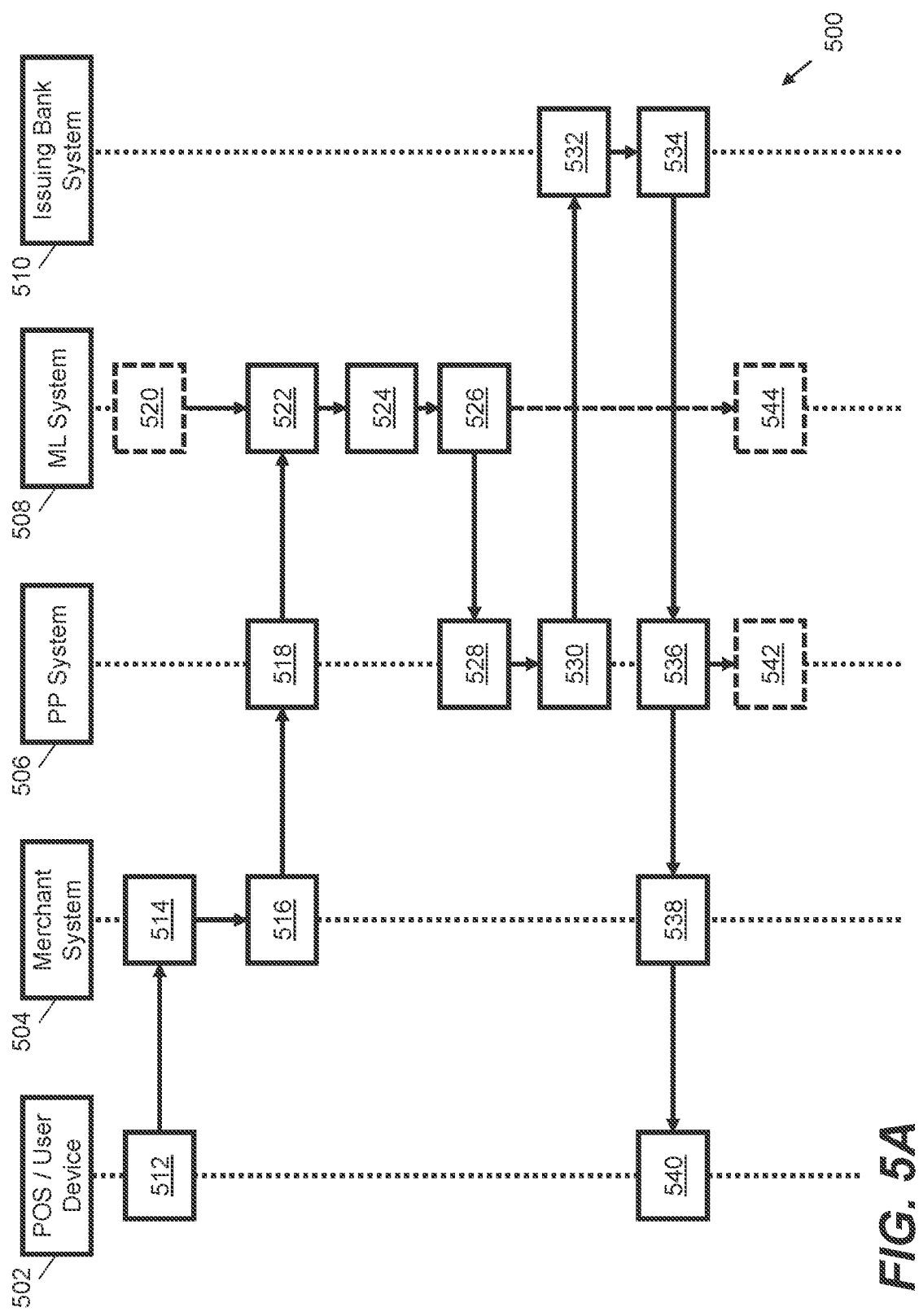
FIGS. 5A and 5B are sequence diagrams showing an example set of processes performed by different computing entities on transaction data.
Figure 5B:
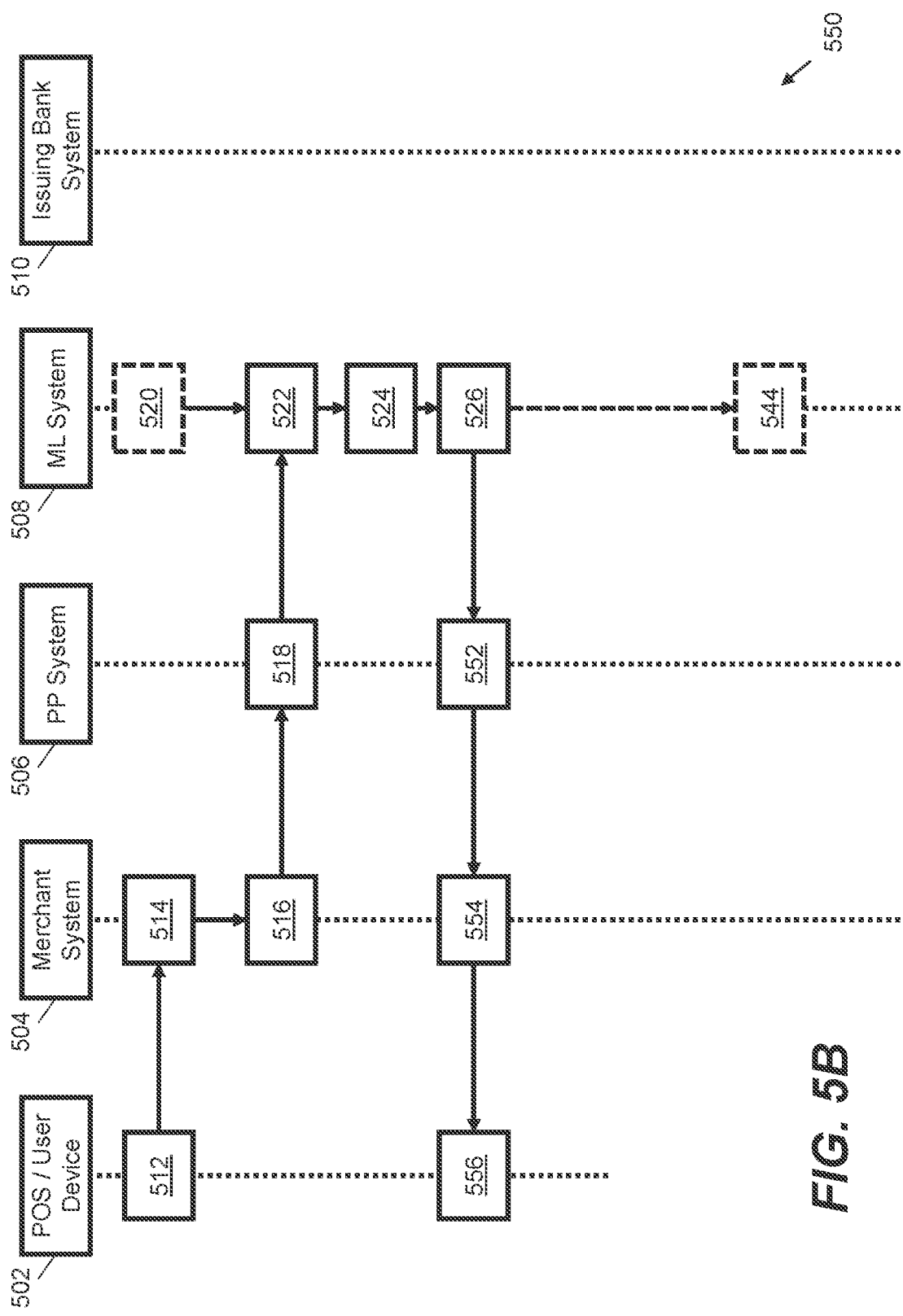

FIGS. 5A and 5B show two possible transaction process flows 500 and 550 respectively. These process flows may take place in the context of the example transaction process systems 100, 102, 104 shown in FIGS. 1A to 1C as well as other systems. The process flows 500 and 550 are provided as one example of a context in which a machine learning transaction processing system may be applied, however not all transaction process flows will necessarily follow the processes shown in FIGS. 5A and 5B and process flows may change between implementations, systems and over time. The example transaction process flows 500 and 550 reflect two possible cases: a first case represented by transaction process flow 500 where a transaction is approved, and a second case represented by transaction process flow 550 where a transaction is declined. Each transaction process flow 500, 550 involves the same set of five interacting systems and devices: a POS or user device 502, a merchant system 504, a payment processor (PP) system 506, a machine learning (ML) system 508 and an issuing bank system 510. The POS or user device 502 may comprise one of the client devices 110, the merchant system 504 may comprise the merchant server 130, the payment processor system 506 may comprise the payment processor server 140, and the machine learning system 508 may comprise an implementation of the machine learning system 160, 210 and/or 402. The issuing bank system 510 may comprise one or more server devices implementing transaction functions on behalf of an issuing bank. The five interacting systems and devices 502 to 510 may be communicatively coupled by one or more internal or external communication channels, such as networks 120. In certain cases, certain ones of these systems may be combined, e.g. an issuing bank may also act as a payment processor and so systems 506 and 510 may be implemented with a common system. In other cases, a similar process flow may be performed specifically for a merchant (e.g., without involving a payment processor or issuing bank). In this case, the machine learning system 508 may communicate directly with the merchant system 504. In these variations, a general functional transaction process flow may remain similar to that described below.

The transaction process flow in both FIGS. 5A and 5B comprises a number of common (i.e., shared) processes 512 to 528. At block 512, the POS or user device 502 initiates a transaction. For a POS device, this may comprise a cashier using a front-end device to attempt to take an electronic payment; for a user device 502 this may comprise a user making an online purchase (e.g., clicking "complete" within an online basket) using a credit or debit card, or an online payment account. At block 514, the payment details are received as electronic data by the merchant system 504. At block 516, the transaction is processed by the merchant system 504 and a request is made to the payment processor system 506 to authorise the payment. At block 518, the payment processor system 506 receives the request from the merchant system 504. The request may be made over a proprietary communications channel or as a secure request over public networks (e.g., an HTTPS request over the Internet). The payment processor system 506 then makes a request to the machine learning system 508 for a score or probability for use in processing the transaction. Block 518 may additionally comprise retrieving ancillary data to combine with the transaction data that is sent as part of the request to the machine learning system 508. In other cases, the machine learning system 508 may have access to data storage devices that store ancillary data (e.g., similar to the configurations of FIGS. 2A and 2B) and so retrieve this data as part of internal operations (e.g., based on identifiers provided within the transaction data and/or as defined as part of an implemented machine learning model).

Block 520 shows a model initialisation operation that occurs prior to any requests from the payment processor system 506. For example, the model initialisation operation may comprise loading a defined machine learning model and parameters that instantiate the defined machine learning model. At block 522, the machine learning system 508 receives the request from the payment processor system 506 (e.g., via a data input interface such as 412 in FIG. 4). At block 522, the machine learning system 508 may perform any defined pre-processing prior to application of the machine learning model initialised at block 520. For example, in the case that the transaction data still retains character data, such as a merchant identified by a character string or a character transaction description, this may be converted into suitable structured numeric data (e.g., by converting string categorical data to an identifier via a look-up operation or other mapping, and/or by mapping characters or groups of characters to vector embeddings).

Then at block 524 the machine learning system 506 applies the instantiated machine learning model, supplying the model with input data derived from the received request. This may comprise applying the machine learning model platform 414 as described with reference to FIG. 4. At block 526, a scalar output is generated by the instantiated machine learning model. This may be processed to determine an "approve" or "decline" binary decision at the machine learning system 508 or, in a preferred case, is returned to the payment processor system 506 as a response to the request made at block 518.

At block 528, the output of the machine learning system 508 is received by the payment processor system 506 and is used to approve or decline the transaction. FIG. 5A shows a process where the transaction is approved based on the output of the machine learning system 508; FIG. 5B shows a process where the transaction is declined based on the output of the machine learning system 508. In FIG. 5A, at block 528, the transaction is approved. Then at block 530, a request is made to the issuing bank system 532. At block 534, the issuing bank system 532 approves or declines the request. For example, the issuing bank system 532 may approve the request if an end user or card holder has sufficient funds and approval to cover the transaction cost. In certain cases, the issuing bank system 532 may apply a second level of security; however, this may not be required if the issuing bank relies on the anomaly detection performed by the payment processor using the machine learning system 508. At block 536, the authorisation from the issuing bank system 510 is returned to the payment processor system 506, which in turn sends a response to the merchant system 504 at block 538, and the merchant system 504 in turn responds to the POS or user device 502 at block 540. If the issuing bank system 510 approves the transaction at block 534, then the transaction may be completed, and a positive response returned via the merchant system 504 to the POS or user device 502. The end user may experience this as an "authorised" message on screen of the POS or user device 502. The merchant system 504 may then complete the purchase (e.g., initiate internal processing to fulfil the purchase).

At a later point in time, one or more of the merchant system 504 and the machine learning system 508 may save data relating to the transaction, e.g. as part of transaction data 146, 240 or 300 and/or categorical history data 241 (as will be discussed in further detail below). This is shown at dashed blocks 542 and 544. The transaction data and/or categorical history data may be saved along with one or more of the output of the machine learning system 508 (e.g., the scalar fraud or anomaly probability) and a final result of the transaction (e.g., whether it was approved or declined). The saved data may be stored for use as training data for the machine learning models implemented by the machine learning system 508 (e.g., as the base for the training data shown in one or more of FIGS. 8 and 10). The saved data may also be accessed as part of future iterations of block 524, e.g. may form part of future ancillary data. In certain cases, a final result or outcome of the transaction may not be known at the time of the transaction. For example, a transaction may only be labelled as anomalous via later review by an analyst and/or automated system, or based on feedback from a user (e.g., when the user reports fraud or indicates that a payment card or account was compromised from a certain date). In these cases, ground truth labels for the purposes of training the machine learning system 508 may be collected over time following the transaction itself.

Turning now to the alternative process flow of FIG. 5B, in this case one or more of the machine learning system 508 and the payment processor system 506 declines the transaction based on the output of the machine learning system 508. For example, a transaction may be declined if the scalar output of the machine learning system 508 is above a retrieved threshold. At block 552, the payment processor system 506 issues a response to the merchant system 504, which is received at block 554. At block 554, the merchant system 504 undertakes steps to prevent the transaction from completing and returns an appropriate response to the POS or user device 502. This response is received at block 556 and an end user or customer may be informed that their payment has been declined, e.g. via a "Declined" message on screen. The end user or customer may be prompted to use a different payment method. Although not shown in FIG. 5B, in certain cases, the issuing bank system 510 may be informed that a transaction relating to a particular account holder has been declined. The issuing bank system 510 may be informed as part of the process shown in FIG. 5B or may be informed as part of a periodic (e.g., daily) update. Although, the transaction may not become part of transaction data 146, 240 or 300 (as it was not approved), it may still be logged by at least the machine learning system 508 as indicated by block 544. For example, as for FIG. 5A, the transaction data may be saved along with the output of the machine learning system 508 (e.g., the scalar fraud or anomaly probability) and a final result of the transaction (e.g., that it was declined).

Machine Learning System with Categorical History Module

Certain examples described herein, such as the machine learning systems 160, 210, 402, and 508 in FIGS. 1A to 1C, 2A and 2B, FIG. 4 and FIGS. 5A and 5B, may be implemented as a modular platform that allow for different machine learning models and configurations to be used to provide for the transaction processing described herein. This modular platform may allow for different machine learning models and configurations to be used as technologies improve and/or based on particular characteristics of the data available.

An exemplary machine learning system 600 is shown in FIGS. 6 and 7, as described in further detail below.

As discussed previously, it should be noted that while in the particular embodiment described below the state data is stored in a table of vectors, the state data could readily be structured as n-dimensional tensors and/or may be stored in some other data structure or format, e.g. in a multi-dimensional array. Similarly the various vectors (e.g. input vector, output vector, etc.) described in respect of this embodiment may also be n-dimensional tensors, and may be stored using any appropriate data structure.

The machine learning system 600 receives input data 601 and maps this to a scalar output 602. This general processing follows the same framework as described previously. The machine learning system 600 comprises a first processing stage (or "lower model") 603 and a second processing stage (or "upper model") 604.

The machine learning system 600 is applied to data associated with at least a proposed transaction to generate a scalar output 602 for the proposed transaction. The scalar output 602 represents a likelihood that the proposed transaction presents a behavioural anomaly, e.g. that the proposed transaction embodies a pattern of actions or events that differs from expected or typical patterns of actions or events. In certain cases, the scalar output 602 represents a probability that the proposed transaction presents an anomaly in a sequence of actions, where the actions include at least previous transactions for that entity and entity-category pair, as outlined in more detail below. The scalar output 602 may be used to complete an approval decision for the proposed transaction, e.g. as described with reference to FIGS. 5A and 5B, may be used to decide whether to approve or decline the proposed transaction.

The input data may include transaction time data and transaction feature data. The transaction time data may comprise data derived from a timestamp such as that shown in FIG. 3B or any other data format representing a date and/or time of a transaction. The date and/or time of the transaction may be set as a time the transaction was initiated at a client computing device such as 110 or 502 or may be set as a time a request was received at the machine learning system 600, e.g. similar to the time of a request as received at block 522 in FIGS. 5A and 5B. The transaction time data may comprise time data for a plurality of transactions, such as the current proposed transaction and a historical set of one or more prior transactions. The time data for the historical set of one or more prior transactions may be received with a request and/or retrieved from a storage device communicatively coupled to the machine learning system 600.

In the arrangement of FIG. 6, the transaction time data is converted into relative time data for the application of one or more neural network architectures. In particular, the transaction time data is converted into a set of time difference values, where the time difference values represent a time difference $\Delta t$ between the current proposed transaction and a prior transaction (generally, the most recent previous transaction). For example, the time difference may comprise a normalised time difference in seconds, minutes, or hours. The time difference $\Delta t$ may be computed by subtracting a timestamp of the previous transaction (or transactions, where multiple differences are being calculated and used) from the timestamp for the proposed transaction. The time difference values may be normalised by dividing by a maximum predefined time difference and/or clipped at a maximum time difference value.

In an inference mode, the machine learning system 600 detects sets of features from the input data 601 using the upper and lower models 603, 604 as outlined in more detail below. The output from the upper model 604 is the scalar value 602, which is used when determining whether or not to block the transaction (e.g. by comparing the scalar value 602 to a threshold).

As shown in FIG. 6, the machine learning system 600 comprises a feedforward neural network-based embedding layer within the lower model 603. In this particular embodiment, the embedding layer is a first multilayer perceptron 610, however it will be appreciated that this could instead be any other type of feedforward neural network such as a transformer layer or a neural arithmetic logic unit.

The first multilayer perceptron 610 comprises a fully-connected neural network architecture comprising a plurality of neural network layers (e.g., 1 to 10 layers) to pre-process the data for the proposed transaction from the input 601. Although a multilayer perceptron is described here, in certain implementations the pre-processing may be omitted (e.g., if the received transaction data in the input data 601 is already in a suitable format) and/or only a single layer of linear mapping may be provided. In certain examples, the pre-processing may be seen as a form of "embedding" or "initial mapping" layer for the input transaction data. In certain cases, one or more of the neural network layers of the first multilayer perceptron 610 may provide learnt scaling and/or normalisation of the received transaction data. In general, the fully-connected neural network architecture of the first multilayer perceptron 610 represents a first learnt feature pre-processing stage that converts input data associated with the proposed transaction to a feature vector for further processing. In certain cases, the fully-connected neural network architecture may learn certain relationships between the elements of the transaction feature data, e.g. certain correlations, and output an efficient representation that takes account of these correlations. In one case, the input transaction data may comprise integer and/or floating-point numbers and the output 612 of the first multilayer perceptron 610 may comprise a vector of values between 0 and 1. The number of elements or units (i.e., output vector size) of the first multilayer perceptron 610 may be set as a configurable hyperparameter. In certain cases, the number of elements or units may be between 32 and 2048.

The output 612 produced by the first multilayer perceptron 610 is divided into two portions 612*a*, 612*b* which are provided to a time-decay cell 614 and categorical history module 616 respectively. It will be appreciated, however, that while these are shown as been wholly separable, arrangements are envisaged in which there is at least some overlap in the portions of the output 612 that are fed to each of the time-decay cell 614 and categorical history module 616.

It should be noted that the input transaction data of the input 601 may comprise data from the proposed transaction (e.g., as received via one or more of a client device, POS device, merchant server device and payment processor server device) and data associated with the proposed transaction that is not contained in data packets associated with the proposed transaction. For example, as explained with reference to FIGS. 1A to 1C and 2A and 2B, the input 601 may further comprise ancillary data (such as 148 and 242), where the ancillary data is retrieved by the machine learning system 600 (such as is shown in FIG. 1C) and/or by the payment processor server 140 (such as is shown in FIG. 1A or 1B). The exact content that is included in the input data 601 may vary between implementations. The present examples are concerned with a general technical architecture for the processing of transaction data rather than the exact form of that data. In general, as the machine learning system 600 comprises a set of neural network layers, parameters may be learnt based on whatever input data configuration is desired or based on what input data is available. The present examples are concerned with the engineering design of such a technical architecture to allow for transaction processing at the speed and scale described herein.

In the example of FIG. 6, the output of the first multilayer perceptron 610 is received by the time-decay cell 614. The time-decay cell 614 is configured to generate output data $o_t$ based on a previous state data $h_{t-1}$, the time difference $\Delta t$, and the portion of the output 612*a* supplied by the first multilayer perceptron 610. The time-decay cell 614 may implement the techniques described in WO/2022/008130 and WO/2022/008131, each of which is incorporated herein by reference.

The previous state data $h_{t-1}$ is a vector of values corresponding to the state of the system from the previous transaction. Those skilled in the art will appreciate that, in general, the previous state data $h_{t-1}$ is stored in memory and provides a history of the patterns of transactions that have taken place until now. State data is stored for each primary entity (e.g. card holder), and so the state data for a given primary entity provides information regarding the previous chain of transactions for that primary entity.

The degree of influence that the historical state data should have on a decision relating to a proposed transaction may be dependent on the time difference $\Delta t$. If a long period of time has elapsed since the previous transaction, some of the state data may not be so relevant when assessing whether the proposed transaction is anomalous or fraudulent. The time-decay cell 614 applies a decaying function to the previous state data $h_{t-1}$ based on the time difference $\Delta t$.

Once the previous state data $h_{t-1}$ has been decayed based on the time difference $\Delta t$, the time-decay cell 614 performs a mapping to generate output data $o_t$. The time-decay cell 614 also stores the new state data $h_t$ in memory for the next transaction.

The mapping process carried out by the time-decay cell 614 may be machine-learning based. For example, the time-decay cell 614 may use a neural network mapping (e.g., one or more parameterised functions) to map the previous state data $h_{t-1}$ and the output 612*a* from the first multilayer perceptron 610 to a fixed size vector output of a predefined size. It will be appreciated, however, that other methods may be used that do not require any such neural network or other machine learning technique.

A portion 612*b* of the output from the first multilayer perceptron 614 is input to the categorical history module 616, and specifically is used by an update layer 619. Unlike the time-decay cell 614 which operates using a single state data vector for each entity, the categorical history module 616 builds a table (e.g. a lookup table) of multiple states, one for each secondary category that the primary entity has interacted with, as can be better understood with reference to FIG. 7.

In typical fraud applications, the primary entity represents the payer or account holder, while a secondary category may represent the beneficiary of funds, for example a merchant. However, it should be understood that the secondary category can be any categorical field in the data. It could, for example, be a numerical or datetime field that has been bucketed into different categories, for example, 'amount' could be bucketed into 'low', 'medium' and 'high' categories; dates and times could be bucketed into hour of day or day of week etc. Categories may also be a composite of multiple categories (e.g. the merchant identity concatenated with a day of week). The categories do not need to be ordinal. Hereafter, in this specific example, we refer to the secondary categorical field as 'merchant' for clarity of notation. Note that all states will still be associated with the primary entity, such that state data is stored and retrieved for a particular entity-category pair. It will be appreciated that there will therefore, in general, be such a table for each primary entity.

In one exemplary software-based implementation, this table is a 2D tensor of shape (merchant_state_size, max_num_merchant_state) whose columns represent individual states for different merchants (it will be appreciated of course different secondary categories could be used in other examples). It will be understood that 'max_num_merchant_state' is the maximum number of merchants (or equivalently, other category values such as day of the week, transaction amount or band, etc.) for which state data is stored, i.e. the number of columns in the table. Meanwhile, 'merchant_state_size' is the number of independent values stored in each column, i.e. the number of rows in the table. As mentioned above, it should be understood that there will generally be such a state data table for each primary entity (i.e. for each account holder), such that the stored merchant (i.e. secondary category) data is specific to that primary entity.

The table in this example has a fixed size and therefore it has a limit on how many merchant states it can store. As an input it takes the lookup table $G_{t-1}$ (for this entity) from the previous time step t-1 and an update vector of size merchant_state_size. As an output, it returns a vector containing the updated merchant state. This vector may, in some embodiments, also include the decayed merchant state, e.g. by providing a vector which is a concatenation of the decayed merchant state and an updated merchant state (for the current merchant), i.e. of size 2*merchant_state_size.

As is shown in FIG. 7, for each transaction the categorical history module 616 performs decay and update logic, similarly to the standard time-decay cell 614. The categorical history module 616 first applies an exponential time decay on all stored states in the table $G_{t-1}$, where the decay is based on the time difference Δt since the last transaction.

The decaying function allows selective and tuned use of previous transaction data (that is to say it can apply a particular degree of 'forgetfulness') based on the time difference Δt between the proposed transaction and a previous transaction, where the previous transaction data is an aggregated function of transaction feature vectors for a plurality of previous transactions.

The decaying function may be applied as a vectorized exponential time decay function of the form $f(s)=[e^{(-s/w\_1)}, e^{(-s/w\_2)}, \ldots, e^{(-s/w\_d)}]$, i.e. as a series of parameterised time decay computations with [w_1, w_2 ... w_d] comprising a set of weights that represent a "decay length" in seconds and where d is the size of the recurrent state vector (this may generally be equal to the length of the state data vector on which the decay function operates). In this case, Δt is passed to the function as s to output a vector of length d, e.g. may be passed as a scalar float value representing the number of seconds elapsed between the previous event (e.g., transaction) for the same entity and the current event (e.g., the proposed transaction). The decay factors (i.e. weights) may be a learned during a training process.

The decay weights may be fixed (e.g. manually configurable) parameters and/or may comprise trainable parameters. In an exponential function case, the decay lengths may include (or be trained to include) a mixture of different values representing decays from a few minutes to a few weeks such that both short-term and long-term behaviour is captured. The time decay function is applied to the state data table from the previous iteration using an elementwise multiplication (e.g., the Hadamard product is computed) between the time decay vector and each state data entry (the state data stored for each category, i.e. column of the table). In this example, the state data comprises a 2-dimensional table of vectors, each of which is the same length as the transaction feature vector output. This effectively controls how much of the state data from the previous iteration is remembered and how much is forgotten.

A range of time decay constants can be used for decaying the table. For example, a short time scale decay will suppress memory contributions from old activity, while long time scale decays will retain memory contributions from old activity. This allows networks to compare new and old activity to determine novelty. Furthermore, the state updates are a function of the input attributes of the events. This means some state elements may only be updated for certain types of events. This is illustrated graphically in FIG. 7 as per the different groupings of rows in the table, where the top three rows are retained for a relatively long period of time, the middle three rows are retained for an intermediate period of time, and the bottom three rows are retained for a relatively short period of time. It will be understood that this is only an example, however, and different periods of time may apply to each portion of the state data as appropriate.

The network may learn that only activity of a particular type (e.g. low value transactions) with a given merchant has been seen before and therefore that the current event is novel even if the merchant has been before. For example, it could learn to ignore the presence of low-value transactions in the past with this merchant when risk scoring current activity that is high value. The actual decays applied may be learned or may be predetermined (and may be user-defined, e.g. during initial set-up or optimisation of the system). In either case, the machine learning system can learn which decay weights should be applied to which combinations of behavioural features.

While in this exemplary embodiment the whole table for a given entity is decayed, other embodiments are envisaged in which only the currently selected column is decayed. To achieve this, a timestamp may be stored for each entity-category pair, and the time difference Δt is taken as the time between the current transaction and the time at which the data for the most recent instance of that entity-category pair was stored in the table.

After the decaying step, the categorical history module 616 extracts the merchant state column matching the current merchantId (or zero vector if it is a new merchant as outlined below). The categorical history module 616 queries the lookup table with current merchantId to see whether the table contains state data (i.e. whether a column exists) for this merchant. If so, that the state data stored against that merchantId is retrieved from the table. Conversely, if it does not exist in the table, a new 'default' state (e.g. a zero vector) can be added to the table.

The state data (retrieved or new as appropriate) is then updated by the update layer 619, using the output portion 612b from the multilayer perceptron 610 (which in turn is derived from the input vector $x_t$ as outlined previously), and inserted it back into the table. While different approaches may be taken for the updating step (i.e. for the steps carried out by the update layer 619), in one implementation the decayed state data vector for the entity-category pair and the input vector from the first multilayer perceptron 610 (i.e. the output portion 612b) are added together using element-wise addition. This results in an output vector $y_t$.

The table is managed as a stack—updated columns are inserted at the front of the table and the least recently updated column is found at the back of the table. Due to the table's size limits, if the table is full then a new merchant state will be added by discarding a state for the least recently seen merchant. As can be seen in FIG. 7, the updated state data for this transaction is inserted at the front of the table, and the 'gap' left behind (as illustrated by the dashed line) is closed.

The outputs $o_t$, $y_t$ of the time-decay cell 614 and categorical history module 616 are received by the upper model 604, and specifically by a second feedforward neural network output layer. In this particular embodiment, the output layer is a second multilayer perceptron 620, however it will be appreciated that this could instead be any other type of feedforward neural network such as a transformer layer or a neural arithmetic logic unit. In this particular embodiment, the input data 601 is also fed to the second multilayer perceptron 620. In this example, the outputs $o_t$, $y_t$ of the time-decay cell 614 and categorical history module 616 are passed directly to the second multilayer perceptron 620. However, other embodiments (not shown) are envisaged in which this passing is done indirectly via one or more further intervening neural network layers.

The second multilayer perceptron 620 is used to generate the scalar output 602. The second multiplayer perceptron 620 comprises a fully-connected neural network architecture comprising in turn a plurality of neural network layers to receive the outputs $o_t$, $y_t$ of the time-decay cell 614 and categorical history module 616 as well as the input data 601, and to map those outputs $o_t$, $y_t$ to the scalar value 602. This may comprise a series of dimensionality reducing layers. A last activation function in the plurality of neural network layers may comprise a sigmoid activation function to map an output to the range of 0 to 1. The second multilayer perceptron 620 may be trained to extract correlations between features that are output by an attention mechanism (e.g. which may use a plurality of attention heads in a manner known in the art per se) and to apply one or more non-linear functions to finally output the scalar value 602.

The scalar value 602 may then be used by another part of the transaction processing pipeline (not shown) when deciding whether the transaction should be allowed to continue as normal or whether it should instead be stopped and marked as fraudulent or anomalous. For example, the system may compare the scalar value 602 to a suitable threshold such that a score exceeding the threshold is flagged as being anomalous.

In a preferred implementation, the state data is entity dependent, i.e. is specific to a particular user, account holder or merchant account. In this manner, the appropriate entity may be identified as part of the transaction data pre-processing and the machine learning system 600 may be configured for that entity. In one case, the machine learning system 600 may apply the same parameters for the neural network architectures for each entity but may store state data separately and may only retrieve historical transaction data and/or ancillary data that is associated with (e.g., indexed by) that entity. As such, the machine learning system 600 may comprise an entity state store, e.g. as described with reference to FIGS. 2A and 2B, whereby the data for different entities may be effectively partitioned. In other cases, the parameters for the decay function may be shared across multiple entities. This may be advantageous to reduce the number of learnable parameters for each entity of the whole machine learning system. For example, the exponential time decay weights described above may be fixed (or learned) and shared across multiple entities, whereas the state data may be unique to each entity.

Training A Machine Learning System for Processing Transaction Data

In certain examples, machine learning systems, such as those described herein, may be trained using labelled training data. For example, a training set may be provided comprising data associated with transactions that have been labelled as "normal" or "fraudulent". In one case, these labels may be provided based on reported fraudulent activity, i.e. using past reports of fraud. For example, data associated with transactions that have been approved and processed without subsequent reports of fraud may be labelled as "0" or "normal"; whereas data associated with transactions that have been declined and/or transactions that have later been reported as fraudulent and otherwise marked or blocked may be labelled as "1" or anomalous.

An end-to-end training process may be carried out such that the machine learning system may learn appropriate values for any and all learnable parameters. This may, for example, comprise training the parameters of any multilayer perceptrons and/or the decay weights for the decaying functions. It will be appreciated that any suitable training algorithm, known in the art per se, may be used and the principles of the exemplary embodiments are not limited to any specific training algorithm. By way of example, however, a suitable training algorithm may be based on stochastic gradient descent and may use backpropagation of the error in model prediction to iteratively improve model parameters in order to find ones that minimise the objective function. In one case, the objective function (which measures the error in model prediction) may be defined to be the binary cross-entropy between the predicted value 602 and the ground truth label ('0' or '1').

Those skilled in the art will appreciate that where reference is made to the various rows and columns of the state data table, the respective roles of these could be exchanged such that state data is stored in rows indexed by the category identifier with the state data values for the various features stored across the columns instead.

It will be appreciated that exemplary embodiments may provide an arrangement in which the categorical history module brings signal extraction from interaction monitoring into the architecture. Advantageously, this may lead to improvements in the speed and/or confidentiality of implementation. Specifically, data scientists no longer need to manually engineer features of this type, which means they do not need to be disclosed for model governance as inputs to the classifier, and implementation time for the models reduces.

Additionally, exemplary embodiments may provide for improvements in detection performance. The categorical history module can learn more subtle interaction logic than human beings are able to engineer by hand in finite time. Specifically, the categorical history module can learn patterns of user activity specific to each category, and detect anomalies based on historical data for the relevant entity-category pair. This approach may provide significant detection boosts relative to the other approaches known in the art per se.

Where technically appropriate, embodiments of the invention may be combined. Embodiments are described herein as comprising certain features/elements. The disclosure also extends to separate embodiments consisting or consisting essentially of said features/elements.

Technical references such as patents and applications are incorporated herein by reference.

Any embodiments specifically and explicitly recited herein may form the basis of a disclaimer either alone or in combination with one or more further embodiments.

While specific embodiments of the present invention have been described in detail, it will be appreciated by those skilled in the art that the embodiments described in detail are not limiting on the scope of the claimed invention.

The invention claimed is:

1. A machine learning system for processing data corresponding to an incoming transaction associated with an entity, the machine learning system comprising:
   a time-decay cell module configured to process at least some of said data corresponding to the incoming transaction, the time-decay cell module comprising:
      a first memory being configured to store first state data corresponding to an immediately preceding transaction;
      a first decay logic stage configured to modify the first state data stored in the first memory based on a time difference between a time of the incoming transaction and a time of the immediately preceding transaction; and
      a first neural network stage configured to determine next first state data using previous first state data modified by the first decay logic stage and a first input tensor derived from the incoming transaction, the first neural network stage being configured to store the next first state data in the first memory for a next transaction, wherein the time-decay cell module is configured to map the modified first state data to generate output data;

the machine learning system further comprising:

a categorical history module configured to process at least some of said data corresponding to the incoming transaction, the categorical history module comprising:

a second memory configured to store second state data for a plurality of categories indexed by a respective category identifier, wherein the second state data stored in the second memory for each category identifier corresponds to a previous transaction associated with the entity and the respective category;

a second decay logic stage configured to modify second state data stored in the second memory based on a time difference between a time of the incoming transaction and a time of a previous transaction, said second decay logic stage being configured to:

when the second memory contains second state data for the entity and category identifier pair associated with the incoming transaction, retrieve said second state data and apply a decaying function to the second state data to generate a decayed version of the second state data, wherein the decaying function is dependent on the time difference, and output the decayed version of the second state data; and an update logic stage configured to:

update the decayed version of the second state data output from the second decay logic stage using a second input tensor generated from the data corresponding to the incoming transaction to generate updated second state data; to store said updated second state data in the second memory for the entity and category identifier pair associated with the incoming transaction; and output an output tensor comprising the updated second state data;

wherein the machine learning system is configured to map the output data from the time-decay cell module and the output tensor from the categorical history module to a scalar value representative of a likelihood that the incoming transaction presents an anomaly within a sequence of actions, and wherein the scalar value is used to determine whether to approve or decline the incoming transaction.

2. The machine learning system as claimed in claim 1, wherein the second decay logic stage is further configured to:

when the second memory does not contain state data for the entity and category identifier pair associated with the incoming transaction, generate new second state data and output said new second state data.

3. The machine learning system as claimed in claim 1, further comprising a second neural network stage configured to apply a second neural network layer having a respective plurality of learned weights to the data corresponding to the incoming transaction to generate the second input tensor, and to provide said second input tensor to the update logic stage of the categorical history module.

4. The machine learning system as claimed in claim 1, further comprising a third neural network stage configured to apply a third neural network layer having a respective plurality of learned weights to the output tensor generated by the update logic stage of the categorical history module to generate the scalar value representative of the likelihood that the incoming transaction presents an anomaly within a sequence of actions.

5. The machine learning system as claimed in claim 1, wherein the update logic stage of the categorical history module comprises:

a fourth neural network stage configured to generate the updated second state data using the decayed second state data and the second input tensor derived from the incoming transaction;

optionally wherein the fourth neural network stage comprises a recurrent neural network.

6. The machine learning system as claimed in claim 1, wherein the second decay logic stage is configured to modify the second state data stored in the second memory for the entity associated with the incoming transaction based on a time difference between the time of the incoming transaction and a time of a most recent transaction for that entity.

7. The machine learning system as claimed in claim 1, wherein the second decay logic stage is configured to modify all second state data stored in the second memory for each entity based on a time difference between the time of the incoming transaction and a time of an immediately preceding transaction.

8. The machine learning system as claimed in claim 1, wherein the second decay logic stage is configured to modify only the second state data stored in the second memory for the entity and category identifier pair associated with the incoming transaction, wherein the second decay logic stage modifies said second state data based on a time difference between the time of the incoming transaction and a time of the previous transaction for the entity and category identifier pair associated with the incoming transaction.

9. The machine learning system as claimed in claim 1, wherein the second memory is configured as a stack, such that retrieved first state data is removed from the stack, and such that updated second state data is stored at the top of the stack.

10. The machine learning system as claimed in claim 1, wherein the categorical history module is configured such that, when the second memory is full, second state data stored against at least one category identifier is erased.

11. The machine learning system as claimed in claim 10, wherein the categorical history module is configured such that when the second memory is full, second state data stored against a least recently seen category identifier is erased.

12. The machine learning system as claimed in claim 1, wherein the second state data stored for each entity and category identifier pair comprises a tensor of values.

13. The machine learning system as claimed in claim 12, wherein the decaying function of the categorical history module applies a respective decay multiplier to each of the values.

14. The machine learning system as claimed in claim 13, wherein at least some of the decay multipliers are learned.

15. The machine learning system as claimed in claim 1, wherein the first neural network stage comprises a recurrent neural network.

16. The machine learning system as claimed in claim 1, wherein the second memory is configured to store second state data for a plurality of entities, wherein for each entity there is stored a plurality of categories indexed by a respective category identifier, wherein the second state data stored in the second memory for each category identifier corresponds to a previous transaction associated with the respective entity and the respective category.

17. The machine learning system as claimed in claim 1, wherein each of the plurality of categories comprises one or more of: a secondary entity; a secondary entity type; a transaction value; a transaction value band; a day of the week; a time of the day; an hour of the day; and a time window.

18. The machine learning system as claimed in claim 17, wherein one or more of the plurality of categories comprises a composite of one or more of: a secondary entity; a secondary entity type; a transaction value; a transaction value band; a day of the week; a time of the day; an hour of the day; and a time window.

19. A method of processing data associated with a proposed transaction, the method comprising:
  receiving an incoming event from a client transaction processing system, the incoming event being associated with a request for an approval decision for the proposed transaction;
  parsing the incoming event to extract data for the proposed transaction, including determining a time difference between the proposed transaction and a prior transaction;
  applying the machine learning system of claim 1 to output the scalar value representative of a likelihood that the proposed transaction presents an anomaly within a sequence of actions based on the extracted data and the time difference, said applying comprising accessing the second memory to retrieve at least the second state data for the entity and the category identifier associated with the transaction;
  determining a binary output based on the scalar value output by the machine learning system, the binary output representing whether the proposed transaction is approved or declined; and
  returning the binary output to the client transaction processing system.

20. A method of processing data associated with a proposed transaction associated with an entity, the method comprising:
  processing, using a time-decay cell module, at least some of said data corresponding to the incoming transaction, the processing comprising:
    storing, in a first memory of the time-decay cell module, first state data corresponding to an immediately preceding transaction;
    modifying, using a first decay logic stage of the time-decay cell module, the first state data stored in the first memory based on a time difference between a time of the incoming transaction and a time of the immediately preceding transaction;
    determining, using a first neural network stage of the time-decay cell module, next first state data using previous first state data modified by the first decay logic stage and a first input tensor derived from the incoming transaction;

storing, using the first neural network stage of the time-decay cell module, the next first state data in the first memory for a next transaction; and
    mapping the modified first state data to generate output data;
  processing, using a categorical history module, at least some of said data corresponding to the incoming transaction, the processing comprising:
    storing, in a second memory of the categorical history module, second state data for a plurality of categories indexed by a respective category identifier, wherein the second state data stored in the second memory for each category identifier corresponds to a previous transaction associated with the entity and the respective category;
    modifying, using a second decay logic stage of the categorical history module, second state data stored in the second memory based on a time difference between a time of the incoming transaction and a time of a previous transaction, wherein the step of modifying the second state data comprises:
      when the second memory contains second state data for the entity and category identifier pair associated with the incoming transaction, retrieving said second state data and applying a decaying function to the second state data to generate a decayed version of the second state data, wherein the decaying function is dependent on the time difference, and outputting the decayed version of the second state data;
    updating, using an update logic stage of the categorical history module, the second state data output using an second input tensor generated from the data corresponding to the incoming transaction to generate updated second state data;
      storing, using the update logic stage of the categorical history module, said updated second state data in the second memory for the entity and category identifier pair associated with the incoming transaction; and
      outputting, using the update logic stage of the categorical history module, an output tensor comprising the updated second state data;
    mapping the output data from the time-decay cell module and the output tensor from the categorical history module to a scalar value representative of a likelihood that the incoming transaction presents an anomaly within a sequence of actions; and
  using the scalar value to determine whether to approve or decline the incoming transaction.

21. The method as claimed in claim 20, further comprising:
  applying a second neural network layer having a respective plurality of learned weights to the data corresponding to the incoming transaction to generate the second input tensor.

22. The method as claimed in claim 20, further comprising:
  applying a second neural network layer having a respective plurality of learned weights to the output tensor to generate the scalar value representative of the likelihood that the incoming transaction presents an anomaly within a sequence of actions.

23. The method as claimed in claim 20, comprising modifying the second state data stored in the second memory for the entity associated with the incoming transaction based on a time difference between the time of the incoming transaction and a time of a most recent transaction for that entity.

24. The method as claimed in claim 20, comprising modifying all second state data stored in the second memory for each entity based on a time difference between the time of the incoming transaction and a time of an immediately preceding transaction.

25. The method as claimed in claim 20, comprising modifying only the second state data stored in the second memory for the entity and category identifier pair associated with the incoming transaction, wherein the decay logic stage modifies said second state data based on a time difference between the time of the incoming transaction and a time of the previous transaction for the entity and category identifier pair associated with the incoming transaction.

26. A non-transitory computer-readable medium comprising instructions that, when executed by a processor, cause the processor to carry out the method of claim 20.

\*    \*    \*    \*    \*